US006957432B2

(12) United States Patent
Ballantyne

(10) Patent No.: US 6,957,432 B2
(45) Date of Patent: Oct. 18, 2005

(54) REAL-TIME SCHEDULER

(75) Inventor: Joseph C. Ballantyne, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 688 days.

(21) Appl. No.: 09/961,649

(22) Filed: Sep. 24, 2001

(65) Prior Publication Data

US 2002/0078121 A1 Jun. 20, 2002

Related U.S. Application Data

(63) Continuation-in-part of application No. 09/531,397, filed on Mar. 21, 2000.
(60) Provisional application No. 60/234,965, filed on Sep. 23, 2000.

(51) Int. Cl.[7] .............................................. G06F 9/46
(52) U.S. Cl. ...................................... 718/100; 718/102
(58) Field of Search ................................ 718/100, 102, 718/104, 105; 703/23–26; 710/200

(56) References Cited

U.S. PATENT DOCUMENTS

| 5,437,047 | A | * | 7/1995 | Nakamura ................... 709/201 |
| 5,937,187 | A | | 8/1999 | Kosche et al. |
| 5,961,585 | A | | 10/1999 | Hamlin |
| 5,995,745 | A | * | 11/1999 | Yodaiken ...................... 703/26 |
| 6,167,425 | A | * | 12/2000 | Beckhoff ...................... 718/103 |
| 6,320,882 | B1 | | 11/2001 | Patterson et al. |
| 6,330,583 | B1 | * | 12/2001 | Reiffin ........................ 718/105 |
| 6,370,606 | B1 | | 4/2002 | Bonola |
| 6,374,286 | B1 | | 4/2002 | Gee et al. |
| 6,421,702 | B1 | | 7/2002 | Gulick |
| 6,466,962 | B2 | | 10/2002 | Bollella |
| 6,470,397 | B1 | * | 10/2002 | Shah et al. .................. 709/250 |
| 6,496,848 | B1 | | 12/2002 | Nankaku |
| 6,754,690 | B2 | * | 6/2004 | Larson ........................ 718/102 |

OTHER PUBLICATIONS

*Emulating Soft Real–Time Scheduling Using Traditional Operating System Schedulers*, by Adelberg, et al., Proceedings Real–Time Systems Symposium 1994, pp. 292–298.
*Solving Hard Real–Time Scheduling Problems on a Single Processor*, by Ecker, Proceedings of the 4th International Workshop on Parallel and Distributed Real–Time Systems 1996, pp. 81–86.

(Continued)

*Primary Examiner*—Majid Bananhhah
*Assistant Examiner*—Syed J Ali
(74) *Attorney, Agent, or Firm*—Banner & Witcoff, Ltd.

(57) ABSTRACT

Methods and computer-executable components for real-time scheduling of CPU resources are disclosed. A performance counter determines when to allocate CPU resources to a thread. When it is time to allocate the CPU resources, the performance counter issues a maskable or non-maskable interrupt to an advanced programmable interrupt controller (APIC). The APIC then issues a maskable non-maskable interrupt to the CPU. In response to receiving the non-maskable interrupt, the CPU allocates resources to the thread. In addition, the disclosed methods and computer-executable components also: (a) allow scheduling of CPU resources such that real-time threads are guaranteed respective portions of time slots, (b) enable real-time scheduling on a non-real-time operating system, and (c) provide scheduling of CPU resources on a uni-processor machine such that at least first and second real-time threads dependent on one another are synchronized.

20 Claims, 8 Drawing Sheets

OTHER PUBLICATIONS

*Proportional Share Scheduling of Operating System Services for Real–Time Applications*, by Jeffay, et al., Proceedings of the 19$^{th}$ IEEE Real–Time Systems Symposium, 1998, pp. 480–491.

*Soft Real Time Scheduling for General Purpose Client—Server Systems*, by Ingram, Proceedings of the Seventh Workshop on Hot Topics in Operating Systems 1999, pp. 130–135.

*Implementing a General Real–Time Scheduing Framework in the RED–Linux Real–Time Kernel*, by Wang and Lin, Proceedings of the 20$^{th}$ IEEE Real–Time Systems Symposium 1999, pp 246–248.

*A Sort Real–Time Scheduling Server on the Windows NT*, by Lin et al., Proceedings of the 2$^{nd}$ USENIX Windows NT Symposium, 1998, pp. 149–155.

*Win32 and Real Time*, by Peterson & Schotland, Circuit Cellar Ink, Apr. 1999, pp. 45–49.

*A Soft Real Time Scheduling Server in UNIX Operating System*, by Chu and Nahrstedt, Interactive Distributed Multimedia Systems and Telecommunication Services, 4$^{th}$ International Workshop, 1997, pp. 153–162.

\* cited by examiner

REAL-TIME SCHEDULER

This application claims priority to provisional U.S. Application Ser. No. 60/234,965, which was filed on Sep. 23, 2000. This application also claims priority to non-provisional U.S. application Ser. No. 09/531,397, which was filed on Mar. 21, 2000. Both of these applications are incorporated herein by reference in their entirety.

BACKGROUND OF THE INVENTION

1. Field of the Invention

The present invention relates to the field of computer operating systems and, in particular, to methods and computer-executable components for facilitating real-time scheduling of CPU resources.

2. Description of Related Art

Microsoft Windows NT® and Windows® 95/98/98SE/ME do not currently support real-time scheduling of CPU resources. For example, with Windows NT®, all interrupts and deferred procedure calls must be completed before execution of a "real-time" priority NT thread. Even more problematic is the fact that third-party virtual device drivers can disable all interrupts in Windows® 9x (95/98/98SE/ME). Further, thread execution on these operating systems is scheduled based on the idea of a thread priority. Threads of equal priority split the CPU resources equally. The highest priority thread that can be run is always the thread that is chosen to run. This means that a thread will never run if there is always a higher priority thread available to run. (ie: is not blocked on some synchronization object). There is no concept of allocating a percentage of CPU resources to a thread on a periodic or single-shot basis. In addition, there is no up-front failure if the required CPU resources are not available because other clients have already reserved the needed CPU bandwidth. Consequently, even the highest priority threads can have their execution delayed for indeterminate periods of time in both operating systems due to the execution of other threads of the same priority as well as the execution of interrupts and DPCs that are not bound in the length of time they may take to complete.

The Windows NT® driver model allows execution in 3 different fundamental layers of the OS, at interrupt time, at DPC time, and at thread execution time. Interrupts are run before anything else. If there is an interrupt pending, and it can be serviced, then servicing it will happen before anything else. After all hardware interrupts are serviced, any pending deferred procedure calls (DPCs) are executed. These DPCs are run in a software interrupt. The DPCs can be interrupted by other interrupts that have a higher priority, but they will all be run before execution of the interrupted thread resumes. After all interrupts have been serviced, and all queued DPCs have been run, then the operating system resumes running a thread. All application level code is run in a thread. Most of the operating system code also runs in threads at a passive interrupt request level (irql).

Well-written Windows NT® drivers spend very little time in their interrupt service routine (ISR). Windows NT® device drivers are supposed to do most of their work in a DPC or in a thread. Thus, well-written drivers do little more in their ISR besides touch their hardware to clear the interrupt, and queue up a DPC in which they will do most of their work. The vast majority of Windows NT® drivers are well behaved so interrupt latency on Windows NT® is very low, usually on the order of tens of nanoseconds to microseconds. A DPC can run on any processor and in any thread context. On a uni-processor system all DPCs must complete before the system will return to rung the thread whose execution was interrupted. On a multiple processor machine, it is possible to have one processor running a thread while a different processor is servicing an interrupt, or running a DPC.

There are two primary obstacles to guaranteed, hard periodic scheduling of threads on Windows NT®. First, there is no API defined to specify to the operating system what periodicity and CPU resources a thread requires. Second, interrupts and DPCs hold off execution of all threads, and the length of time those interrupts and DPCs can run is unbounded.

On Microsoft Windows® 95, 98, 98SE, and ME the situation is worse. There are a significant number of poorly-written third-party device drivers (i.e., VxDs) that disable all interrupts on the operating system. Sometimes, these device drivers will disable interrupts for extended periods of time. When interrupts are disabled nothing else in the system can run except the code that turned off interrupts. On Windows NT® it is considered unacceptable to turn off all interrupts. There are very few places in the Windows NT® kernel where all interrupts are turned off. However, on Windows® 95 originally, the only way to disable one interrupt was to disable them all. There was no concept in that operating system of multiple interrupt request levels (IRQL). Interrupts were either enabled, or disabled, and the only priority relationships between interrupts were those imposed by the programmable interrupt controller (PIC) at the hardware level. In the software, all interrupts were treated equally. In fact, the kernel interrupt service code actually muddled the priority relationships between interrupts that were imposed at the hardware level. Since it made it possible for a lower priority interrupt at the hardware level to interrupt code that serviced hardware with an interrupt at a higher priority level if the interrupt service routine for the higher priority interrupt enabled interrupts.

This situation changed somewhat with Windows® 98 when the Windows Driver Model (WDM) support was added to the operating system. At least for WDM drivers, there was now the concept of IRQL and interrupt priority levels in the software. However, all of the legacy third-party device drivers continue to run the same way they previously operated. All of the legacy kernel system code still deals with interrupts as either ON or OFF. Consequently, even in Windows® 98, 98SE, ME there is lots of code in the operating system and in third-party device drivers that disables interrupts.

In order to perform any real-time scheduling on Windows® 9x, something must be done to solve the problem of how to get control from the existing code when interrupts are disabled. The assembly language instruction for turning off maskable interrupts is CLI. To re-enable interrupts the instruction is STI. Interrupts can also be enabled in ring 0 code by popping the EFLAGS register off of the stack. There are CLIs, STIs, and PUSHFD, POPFD instructions all through the Windows® 9x code base. Unless control of the CPU can be taken away from code that is running with interrupts disabled, there is no hope of enabling guaranteed hard real-time scheduling. Scheduled threads will not be allowed to run until after the STI instruction is executed.

Accordingly, it is an object of the present invention to provide improved methods and computer-executable components for facilitating real-time scheduling of CPU resources.

BRIEF SUMMARY OF THE INVENTION

The present invention overcomes some limitations of the prior art by providing methods and computer-executable components for performing real-time scheduling and for synchronizing execution of real-time threads with each other and other non real-time threads.

In one embodiment, a method facilitates real-time scheduling of CPU resources on a microprocessor. A counter (such as a performance counter, timer or other device) is used to determine when to switch CPU resources to a thread. When it is time to allocate the CPU resources, the counter generates an interrupt, which is fed to an interrupt controller, such as an advanced programmable interrupt controller (APIC). The interrupt controller then causes the CPU to execute the appropriate interrupt handler, which switches the CPU resources to the thread. Preferably, the interrupt used to gain control from the non real-time operating system is a maskable interrupt, while the interrupt used to switch between real-time threads is non-maskable.

In another embodiment, the counter interrupt line could be directly connected to the CPU rather than going through the APIC first. The counter would, in this example, issue a non-maskable interrupt directly to the CPU.

In a further embodiment, the present invention allows a CPU, which is running a non-real-time operating system, to also perform real-time scheduling of CPU resources. In this embodiment, the present invention treats the execution of non real-time operating system as a single real-time thread. The invention allocates a certain guaranteed percentage of the CPU to the thread running the non real-time operating system, and in addition gives all unallocated or unused time to that thread as well. This allows the non real-time operating system to run as fast as it did previously when there are no other real-time threads running. When there are other real-time threads running, the speed of execution of the operating system slows by the percentage of time actually used by the other real-time threads. The smallest period of time that the real-time scheduler will time slice is called a time-slot. The invention executes each real-time thread running on the CPU for its corresponding portion of the time slot. When the portion of time corresponding to one thread expires, the next real-time thread is executed until its portion of time expires. This is a round-robin scheduling algorithm that executes every runnable real-time thread every timeslot. Other scheduling algorithms are possible—such as earliest deadline first—which require fewer overall thread switches.

In still another embodiment, the present invention guarantees that each real-time thread will be executed (i.e. allocated CPU resources) for its respective portion of the time slot. Preferably, this is accomplished by instructing an APIC to issue a maskable or non-maskable interrupt to the CPU. The APIC will issue a local timer interrupt to the CPU whenever the time slot (i.e. the period of time during which each real-time thread is guaranteed to execute at least once) for the CPU begins. Whenever a thread's portion of the CPU is expired, a performance counter preferably issues either a maskable or non-maskable interrupt in order to switch execution to the next real-time thread. In the current embodiment, the performance counter interrupts are non maskable—thus interrupts can stay disabled the whole time that real-time threads are being run, and when control is switched back to the Windows real-time thread, the interrupt flag is restored to the state it had when control was taken from Windows.

In still a further embodiment, the present invention enables scheduling of CPU resources such that real-time threads (which are dependent on data from one another) are synchronized. In this embodiment, the present invention defines a time slot for which said CPU resources are to be allocated. Portions of the time slot to be allocated to real-time threads are preferably determined either by allowing each thread to request a portion of the time slot or by dynamically assigning portions based on historical use. For each real-time thread that is not blocked on a synchronization object (in this embodiment, the synchronization objects are spinlocks), the thread is executed until its portion of the time slot expires or the thread tries to acquire a synchronization object owned by another real-time thread (in which case it blocks), whichever comes first. If the thread is blocked on a synchronization object, the scheduler gives its allocated CPU resources to the thread that owns the synchronization object until the owning thread releases the spinlock—at which time the scheduler continues running the thread that was blocked. Note that in the current embodiment, the only synchronization object currently supported is a spinlock. Further, since spinlocks were defined for the Windows platform, and are used by existing drivers, the current embodiment allows real-time threads to synchronize with non real-time windows threads through the use of spinlocks. The operating system spinlock implementation was modified so that spinlocks in most cases no longer do a spinwait—rather—they transfer execution to the real-time thread that owns the lock. The modified spinlock code is included as an appendix to this application.

Of course, the methods of these embodiments may also include other additional components and/or steps.

Other embodiments are disclosed and claimed herein as well.

BRIEF DESCRIPTION OF THE DRAWINGS

The present invention is illustrated by way of example and not limited in the accompanying figures in which like reference numerals indicate similar elements and in which.

DETAILED DESCRIPTION OF THE INVENTION

Figure 1:
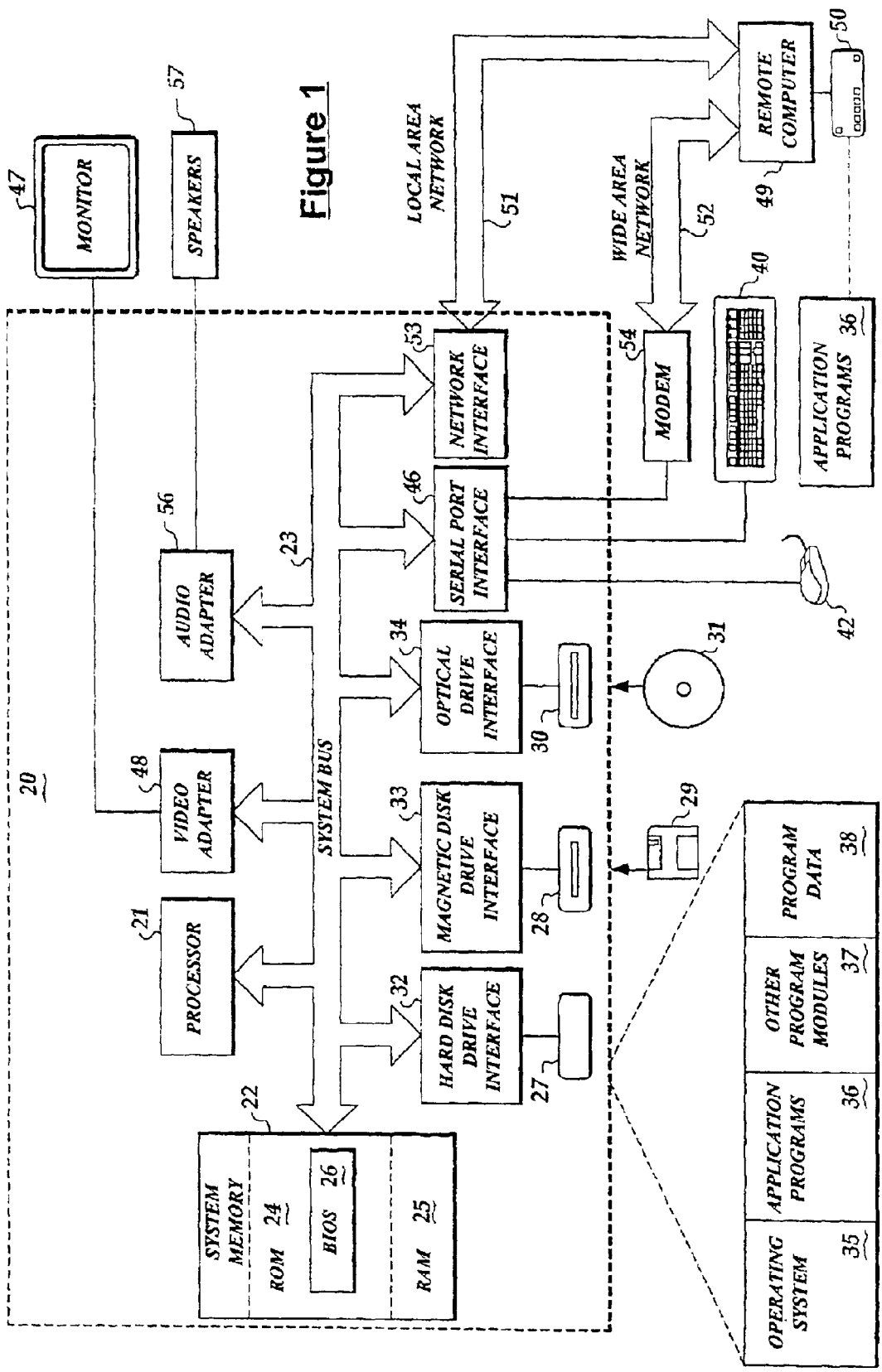
FIG. 1 is a block diagram of a general-purpose computer system capable of being used in conjunction with the present invention.

The present invention provides methods and computer-executable components for facilitating real-time scheduling of CPU resources. In particular, this invention overcomes the limitations of the prior art by preferably using a performance counter to count unhalted cycles or instructions executed on the CPU. After a determined number of cycles or instructions transpire, the performance counter issues a maskable or non-maskable interrupt to a programmable interrupt controller (PIC), such as an APIC on the Intel x86 CPU or the AMD Athlon and Duron (K7) CPU. Issuance of the MI or NMI triggers execution of the scheduler, and thus, switches thread execution on a real-time basis. In addition, the disclosed methods and computer-executable components also: (a) allow scheduling of CPU resources such that real-time threads are guaranteed respective portions of time slots, (b) enable real-time scheduling on a non-real-time operating system, and (c) provides synchronization methods that can be used to synchronize between real-time and non real-time threads. Thus, this invention overcomes the problems of the prior art and provides real-time scheduling of CPU resources and synchronization of real-time threads.

Before proceeding with a detailed discussion of this case, the following terms are defined in order to facilitate a better understanding of the present invention.

"Advanced configuration and power interface" (ACPI) is a power management specification that makes hardware status information available to the operating system. ACPI enables a PC to turn its peripherals on and off for improved power management especially in portables. It also allows the PC to be turned on and off by external devices, so that the touch of a mouse or the press of a key will "wake up" the machine.

An "advanced programmable interrupt controller" (APIC) is interrupt handling hardware that can support symmetric multiprocessing (SMP) for Intel multiprocessor systems. In multiprocessor systems there are both local APICs that reside on each CPU, and an IO APIC that communicates with the local APICs on each CPU. All Intel processors from the Pentium MMX (P54C) on up have a local APIC. The Pentium II and newer processors can enable and disable the local APIC under software control. The Pentium MMX local APIC was enabled and disabled according to voltage levels sampled on certain pins of the processor when the processor came out of reset. That means the Pentium local APIC cannot be enabled if the system designer turned it off in hardware. Most Pentium systems disable the local APIC.

An "application program interface" (API) is a set of well-defined function calls that can be made by one software module to another software module. In many cases this takes the form of an application program calling functions in the operating system or other system program such as a database management system (DBMS). APIs are implemented by writing functions in one software module in a fashion that enables calls to those functions from external modules to be linked to the module containing the function.

A "central processing unit" (CPU) as used herein is the computing portion of a processor or microprocessor. Examples of such processors are the Intel Pentium 4GB, Pentium MMX 4GB, Pentium Pro 64GB, Pentium II 4GB MMX, Celeron 4GB MMX, Xeon PII 64MMX, Pentium III 4GB MMX KNI, or Xeon PIII 64GB MMX KNI. Other suitable processors are also available from Digital Equipment Corporation, Advanced Micro Devices, and Cyrix Corporation.

A "counter" is a variable in programming, a hardware chip or a portion thereof, that is used to keep track of anything that must be counted.

A "driver," also called a "device driver," is a program routine that links a peripheral device to the operating system. A driver contains the precise machine language necessary to perform the functions requested by the application or the operating system.

A "global descriptor table" (GDT) is a table used by the operating system to identify the descriptors for shared data.

An "interrupt descriptor table" (IDT), or an "interrupt dispatch table" is a table used by the operating system to identify software interrupt handlers or interrupt service routines for each of the supported interrupts in the system. In the event that an interrupt is received or an interrupt instruction is executed by the CPU, the CPU will look up the appropriate address for the handler for that interrupt and then transfer control to that handler.

An "interrupt request line" (IRQ) is a hardware interrupt line or trace on a PC. AT compatible PCs support 16 hardware interrupts. One of these is used to support a cascaded interrupt controller, so there are 15 external interrupt sources that can be supported on the PC AT compatible system. Machines with APICs can support additional hardware interrupts up to 256 which is the maximum size of the x86 IDT. Most non PCI devices do not share interrupts. PCI devices can and many times do share interrupts.

An "interrupt service routine" (ISR) is a program routine executed in response to an interrupt. The IDT contains pointers to the entry points of the interrupt service routines.

An "interrupt" is a signal that gets the attention of the CPU and is usually generated when I/O is required. For example, hardware interrupts are generated when a key is pressed or when the mouse is moved. Disk drive's will generate interrupts when they have completed a read or write and are ready for the next command. When an interrupt occurs, control is transferred to the operating system, which determines the action to be taken. Interrupts are prioritized; the higher the priority, the faster the interrupt will be serviced.

A "machine cycle" is the shortest interval in which an elementary operation can take place within the processor. It is made up of some number of clock cycles. On current processors many instructions run in one clock cycle—thus one machine cycle is one clock cycle.

A "maskable interrupt" (MI) is an interrupt on the processor that can be masked or unmasked by software running on the processor. When an interrupt is masked, it is ignored by the processor until software unmasks it.

"Multitasking" is the running of two or more programs in one computer at the same time. The number of programs that can be effectively multitasked depends on the type of multitasking performed (preemptive vs cooperative), CPU speed and memory and disk capacity.

"Multithreading" is multitasking within a single program. It allows multiple streams of execution to take place concurrently within the same program, each stream processing a different transaction or message.

A "non-maskable interrupt" (NMI) is an interrupt on the processor that cannot be masked by software. When this type of interrupt is made active, the interrupt will be serviced. Software cannot mask or force the processor to ignore this interrupt. True non-maskable interrupts do not exist on the PC platform today. There is a way to mask even "non-maskable interrupts"—but you must do additional work to that involved in masking maskable interrupts. Maskable interrupts can be disabled on an x86 processor by simply executing the CLI instruction. Maskable interrupts can be enabled on an x86 processor by executing the STI instruction. Executing a CLI instruction or clearing the IE bit of the EFLAGS register will NOT prevent a "non-maskable interrupt" from occurring. Normally a non-maskable interrupt (NMI) is used to report malfunctions such as parity, bus and math coprocessor errors. In the present invention, an NMI can be used to instruct the CPU to switch execution from one thread to another.

An "operating system" is the master control program that runs a computer. The operating system is loaded when the computer is turned on, and its core, called the kernel, is at least partly resident in memory at all times. Operating systems, as the term is used herein, includes but is not limited to: Microsoft Windows® 95, 98, 98SE, ME, Microsoft Windows NT®, UNIX, Linux and Macintosh System 7.

An "OPEN programmable interrupt controller" (OpenPIC) is an SMP chip architecture endorsed by AMD and Cyrix Corporation that provides symmetric multiprocessing (SMP) for x86 and PowerPC systems.

A "programmable interrupt controller" is an Intel 8259A chip that controls interrupts or any other chip capable of controlling interrupts. Starting with the 286-based AT, there are two PICs in a PC, providing a total of 15 usable IRQs. The PIC has been superseded by Advanced Programmable Interrupt Controllers or APICs, which are enhanced for multiprocessing.

A "scheduler" is a part of the kernel or a device driver in an operating system that initiates and terminates processes (programs or applications) and threads. In addition, a scheduler periodically decides which thread should be run next and switches control to that thread.

A "scheduling algorithm" is a method used to schedule jobs for execution. Priority, length of time in the job queue, least recently used, and available resources are examples of criteria that can be used in a scheduling algorithm.

A "thread" is the state that must be maintained by a scheduler in order to allow multiple paths of execution through a piece of code, or in order to allow the CPU(s) to be shared between multiple running programs.

A "time slot" is a periodic amount of time during which a CPU can execute instructions. The time slot can be any amount of time such as, for example, 1 ms. In this invention, a time slot is the smallest period which the scheduler will allow a real time thread to specify as its period. The real-time scheduler schedules each real-time thread to run once during every time-slot. The fraction of the time-slot for which each thread runs corresponds to the amount of time reserved for that thread when the thread was created.

A "virtual device driver" (VxD) is a special type of Windows® driver that allows Window® to perform functions that cannot be done by applications communicating with Windows in the normal manner. VxDs run at the most privileged CPU mode (ring 0) and allow low-level interaction with the hardware and internal Windows® functions, such as memory management. Consequently, poorly-written VxDs can cause the operating system to crash.

The "Windows driver model" (WDM) is a device driver architecture from Microsoft that is a subset of the Windows NT® driver model. WDM enables a single driver to run on both Windows® 98 and Windows NT®. Hardware vendors can use WDM to write one driver for their hardware that will work on both operating systems.

Now therefore, in accordance with the present invention, an operating system executes on a computer, such as a general-purpose personal computer. FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including handheld devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general-purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer-readable media which can store data that is accessible by a computer, such as magnetic cassettes, flash memory cards, digital versatile disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules or components 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. One or more speakers 57 are also connected to the system bus 23 via an interface, such as an audio adapter 56. In addition to the monitor and speakers, personal computers typically include other peripheral output devices (not shown), such as printers.

Figure 2:
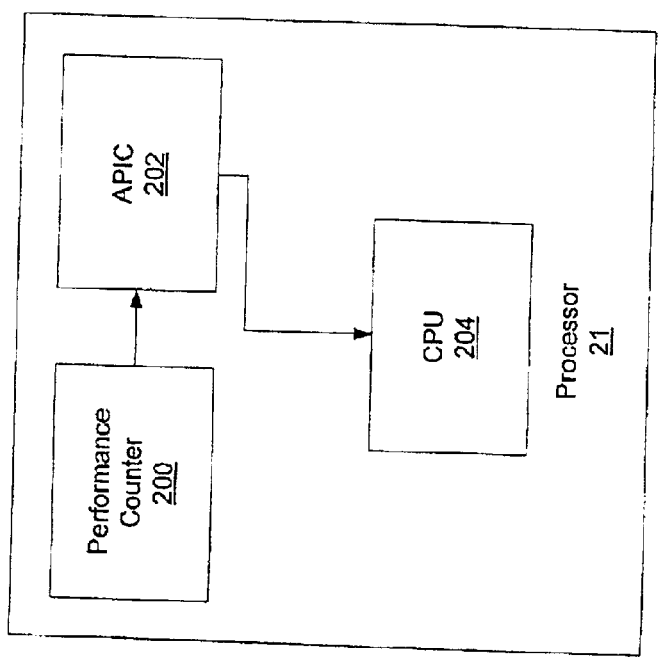
FIG. 2 is a block diagram of the performance counter, APIC and CPU located within the microprocessor of FIG. 1.

The personal computer 20 may operate in a networked environment using logical connections to one or more remote computers, such as remote computer 49 or any of the computers shown in FIG. 2. Each remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet. As depicted in FIG. 1, the remote computer 49 communicates with the personal computer 20 via the local area network 51. The remote computer 49 communicates with the personal computer 20 via the wide area network 52.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The next figure, FIG. 2, provides a partial overview of an exemplary processor 21 capable of being used in conjunction with the present invention. Preferably, processor 21 is one of the following chips available from Intel Corporation: the Pentium II 4GB MMX, Pentium III 4GB MMX KNI, Celeron 4GB MMX, Xeon PII 64GB MMX, or Xeon PIII 64GB MMX KNI. In addition, the AMD Athlon and Duron processors which are based on the K7 processor architecture will also work with the present invention, as will the Intel P4 processors. As shown in FIG. 2, the processor 21 preferably includes at least one local performance counter 200 and at least one local APIC 202. It should be noted that the performance counter 200 could be any type of programmable or re-settable counter that counted any type of instruction (e.g., halted, unhalted, etc.) or cycle (e.g., clock cycle, machine cycle, etc.). Similarly, the performance counter 200 could simply be any type of programmable or re-settable timer, or any other type of device capable of determining when to allocate CPU resources. It should also be noted that the APIC 202 could be any type of interrupt controller, such as a PIC, a traditional APIC, an APIC embedded within the processor (as shown) or an OpenPIC.

Further, the performance counter 200 and APIC 202 need not be local or located within the processor 21. However, using a performance counter 200 and an APIC 202 locally located within the processor 21 will decrease the distance between the performance counter 200, APIC 202 and CPU 204. This will reduce the signal propagation delay and thus, will improve the performance and timing characteristics of the present invention. Consequently, the above-referenced Pentium, Pentium II, Pentium III, Pentium IV, and Athlon/Duron processors are preferable, because embedded inside the processor 21 are: a performance counter 200, an APIC 202 and a CPU 204. The basic architecture, instruction-set reference and system programming guide for these Pentium processors are publicly available and fully set forth in The Intel Architecture Software Developer's Manual, Volumes 1–3, Order Numbers 243190-92. Although inclusion of this manual is not necessary to enable a person of ordinary skill in the art to make and use this invention, the manual is nonetheless incorporated herein by reference—in its entirety—in order to provide the reader with background technical information regarding the performance counter 200, APIC 202 and CPU 204 of the preferred processor.

Figure 3:
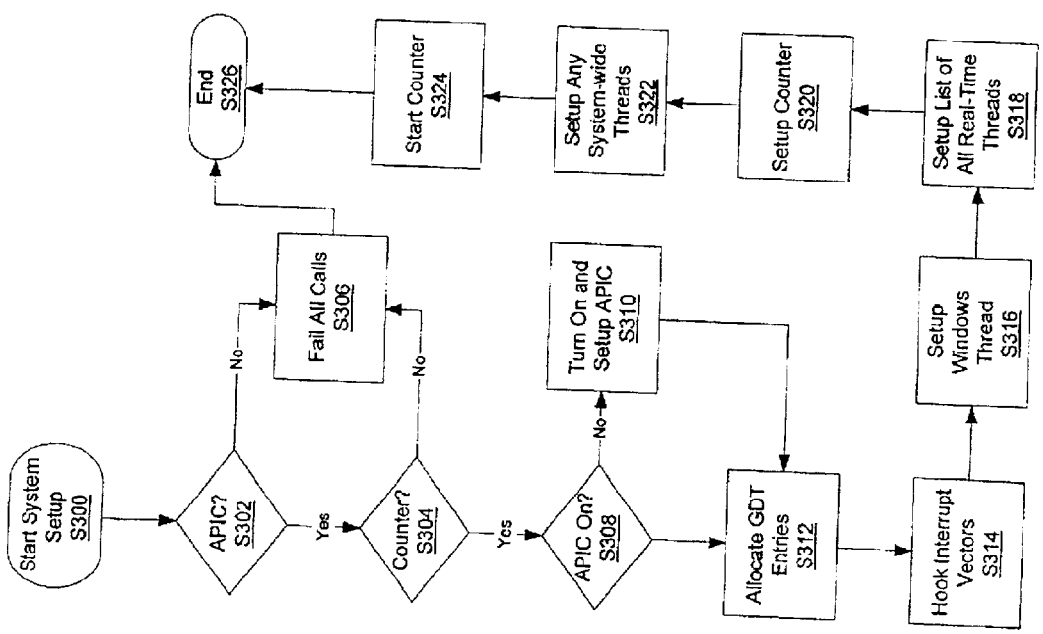
FIG. 3 is a flow chart illustrating an exemplary process of setting up the microprocessor and operating system used in the present invention.

FIG. 3 shows a flow chart of an exemplary process of setting up the processor 21 and operating system used in the present invention. The present invention is implemented as a driver that loads very early in the boot process of Windows and which exports functions some which can be used to create and destroy real-time threads. After the driver is started S300, the driver first determines whether an interrupt controller, PIC, or APIC is available and capable of being used in accordance with the present invention S302. If, for example, an APIC 202 is available—as it is with the above-referenced processors, then the driver determines whether a counter, timer or other usable device is also available S304. If an APIC S302 or a counter S304 is not available, then the driver will preferably fail all calls to it S306—irrespective of the fact that the driver stays loaded in memory.

If an APIC 202 and counter 200 are available and capable of being used S302-04, then the driver examines the local APIC to determine whether the controller is "on" S308. If the controller is not "on," then the driver will turn "on" and setup the APIC S310. As part of this setup, the APIC 202 will be preferably programmed to: (1) issue a MI to the CPU 202 every time an interrupt is received from the local APIC timer, and (2) issue an NMI to the CPU 202 every time the performance counters overflow to zero and issue an interrupt and (3) instruct the CPU 202 to look to the appropriate entry in the IDT upon receipt of a MI or NMI from the APIC 202.

After the driver determines that the APIC is "on" S308, or turns the APIC "on" and sets it up, all GDT entries for the applicable shared data are then updated S312. The applicable interrupt vectors are then "hooked" S314. In other words, the old entry in the IDT is stored, and the address for the real-time-thread-switching code is input into the entry in the IDT S314. A real-time thread is then created for the Windows® kernel or other operating system S316, an example of which is discussed below in connection with FIG. 5. Preferably, this thread only contains state information regarding the stack, processor and floating point unit. Further, except for the real-time thread created for running Windows, these threads are allowed to make only a very few specific system calls during their execution. A list of all real-time threads is then set up S318, and the real-time thread for Windows® or other operating system is added to the list.

The performance counter 200 is next set up for the first time S320. As part of this setup, the driver will program the counter 200 to issue an interrupt to the APIC 202 every time the counter rolls over (i.e., wraps to zero (0)), thereby instructing the CPU to switch execution to a new thread in accordance with the invention. The issued interrupt can be either an MI or NMI (i.e., maskable or non-maskable interrupt). In the current embodiment, the interrupt from the performance counters is always a NMI. In some situations, one type of interrupt may be preferred over another. For example, using an MI instead of an NMI will make certain APIs, which synchronize by disabling interrupts, callable from a real-time thread. However there are other issues which must be handled if the performance counter interrupt is maskable. Primarily, that interrupts will have to be enabled during the execution of real-time threads. If the execution of interrupt code is not desired during the execution of real-time threads, then some mechanism for deferring the handling of those interrupts must be implemented. Note that one way to do this is to mask the maskable interrupt pin on the processor in the local APIC. Then external maskable interrupts will not fire, and a maskable interrupt—either the local apic timer, or the performance counters, can be used to switch between real-time threads.

The performance counters 200 are normally programmed to count machine cycles. They can be optionally programmed to count other things such as unhalted cycles, executed instructions or some other event. Note that when initially setting up the performance counters, they are programmed to count cycles, but they are also disabled from counting and the interrupt they generate is masked. This is because at setup time, there is only 1 real-time thread, and that is the Windows real-time thread. Since there is only one thread, there is no need to switch between real-time threads. Hence the local apic timer interrupt which is used to take control from windows and switch to the first non Windows real-time thread is also masked. Once an additional real-time thread is created, the local apic timer interrupt will be unmasked, and then when the first real-time thread is switched to, the performance counters will be programmed and unmasked. When switching between real-time threads, one of the final steps in that process is the programming of the performance counters. The performance counters are initialized so that they will roll over or overflow to zero in the desired amount of time. If a real-time thread had allocated 10% of the CPU, and the system time-slot were 1 ms (as it is in the present embodiment), then the desired amount of time would be 100 us. The performance counters are programmed by loading the negative of the desired value into their counter. For example, if the scheduler would like the next thread to be executed 3 cycles in the future, then the counter 200 would be assigned the hexadecimal number 0xFFFFFFFD (i.e., 0x00000000 minus 3=0xFFFFFFFD). If the next thread was to be executed in 6 cycles, then the counter 200 would be assigned the hexadecimal number 0xFFFFFFFA (i.e., 0x00000000 minus 6=0xFFFFFFFA), and so on. In the above case, if the processor speed were 1 Ghz, then 100 us would correspond to 100,000 cycles, and the performance counters would be loaded with 0xFFFE7960 so they would overflow 100,000 cycles later and generate an NMI which would cause the real-time scheduler to gain control and switch to the next thread.

If there are any internal real-time threads to be executed, the process next Creates them S3222. An example of an internal thread that might be used is a thread that monitors overhead for the real-time scheduler process. However, other system-wide threads could also be implemented if desired. Lastly, the performance counter 200 is started S324 and the system-setup process terminates S326.

Figure 4:
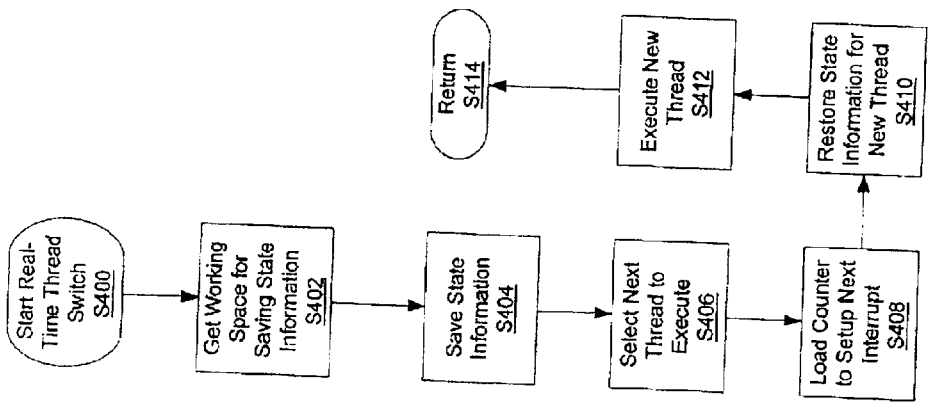
FIG. 4 is a flow chart depicting an exemplary process for switching execution from one real-time thread to another.

FIG. 4 depicts a flow chart of an exemplary process for switching execution from one real-time thread to another after the system-setup process has completed S326. The address in memory for the start-real-time-thread-switch code is stored in the IDT as described above. Whenever the counter 200 reaches zero, the counter issues an interrupt to the APIC 202. The APIC 202 routes the interrupt as either a MI or NMI to the CPU 204. The CPU 204 consults the IDT in order to determine the memory address for the MI or NMI, and thus starts execution of the start-real-time-thread-switch process S400.

On execution, the code saves as little as possible on the existing stack. This is to minimize the chances of causing a stack overflow. The code does not know if it has a valid data segment, so it saves EAX on the stack, and uses EAX to load a known valid and flat DS selector. After it has a valid data selector, the threadswitch code saves the original DS in a temporary storage location, then loads EAX with a pointer to the current threads state structures, and then uses those structures which were allocated during thread creation time to save all of the thread state except for EAX. The state information could include information regarding any one or more of the following: the processor state, the floating-point unit state, the stack and/or the counter 200. The state information is then saved in the working space S404, and the next thread (i.e., new thread) to be executed is selected S406. Of course, any scheduling algorithm could be used to select the next thread for execution. The counter 200 is next assigned a value to setup the next interrupt S408. The process restores the previously stored state information pertaining to the new thread to be executed S410. The CPU 204 is next setup to execute the new thread S412. The start-real-time-thread-switch process then returns control to the CPU 204 for execution of the new thread S414.

Figure 5:
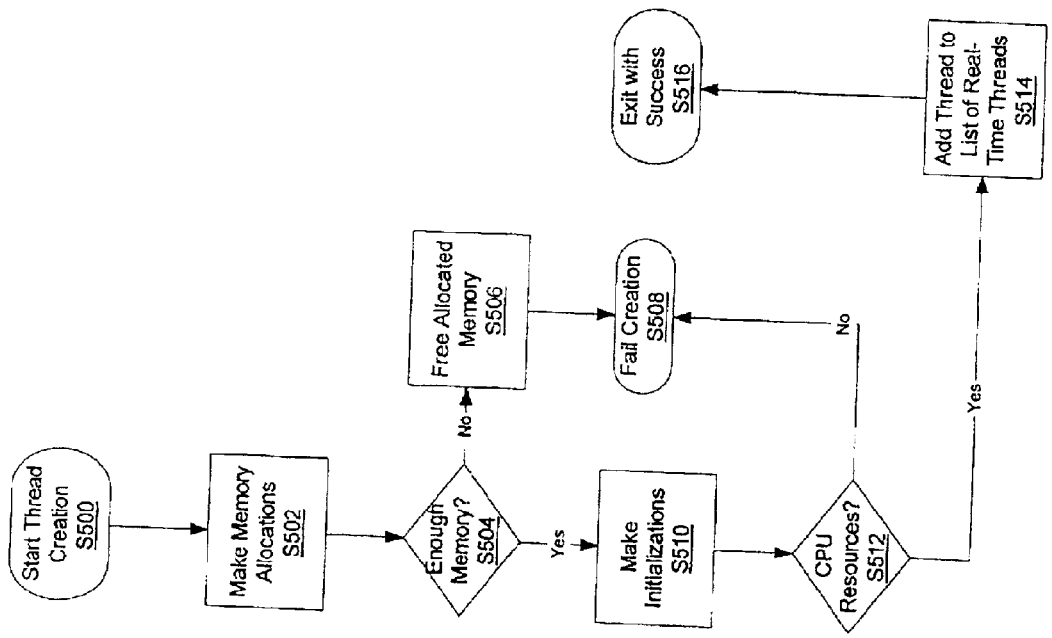
FIG. 5 is a flow chart showing an exemplary process of creating new real-time threads.

FIG. 5 illustrates a flow chart of an exemplary process of creating new real-time threads. Whenever a new real-time thread is to be created, such as in S316, a thread-creation process is called S500. The process first makes a locked memory (i.e., non-paged pool) allocation for all applicable space, such as: stack space, state space and floating point unit space S502. If the process was unable to allocate sufficient memory, then all allocated memory is freed S506 and the thread-creation process is failed S508.

However, if the process is able to allocate sufficient memory for the applicable space, the process makes all applicable initializations S510 including, but not limited to one or more of the following: the stack, the processor state, and the floating point state. If sufficient CPU resources are not available to service the real-time thread, then the thread-creation process is also preferably failed S508. Otherwise, if sufficient CPU resources are available to service the real-time thread S512, then the available CPU resources is updated to include the newly created thread's reservation, and then the thread is added to the list of real-time threads S514 and the thread-creation process exits with success S516. Note that the real-time scheduler maintains a variable that tracks the total amount of CPU that has been allocated to real-time threads. It uses this to prevent the CPU from being over allocated. If a create real-time thread call were to put the allocated CPU bandwidth above 100%, then the create call is failed. In this way, once a thread has been created, the bandwidth allocated to it is reserved for its own use. At startup time, the initialization code allocates 133 MHz of CPU bandwidth to the Windows real-time thread. This ensures that Windows always gets some percentage of CPU bandwidth. No matter how many real-time threads are running on a processor, Windows will never get less CPU than it would have on a 133 MHz system. Note that the amount of CPU allocated to Windows was selected based on the CPUs available at the time Windows Millennium (ME) shipped—and was targeted for the 9x platform. With CPUs being much faster now, and current Windows code running slower, it would be prudent to modify the amount of CPU allocated to the operating system to ensure good performance. It is very easy to change how much CPU windows is allocated, and the number should be determined based on how fast the processors are, as well as the processing requirements of the operating system. In the implementation shipped on Windows ME, we allowed real-time threads to allocate up to X%=(processor speed in MHz—133)/processor speed in MHz of the CPU. 87.7% in the case of a 1 GHz processor for example.

It should also be noted that when a real-time thread terminates before expiration of its CPU resources, or whenever it has completed its work for the current period, and thus, potentially before issuance of the applicable MIs or NMIs, the real-time thread should preferably yield the balance of its CPU resources. This is preferably accomplished by calling the RtYield api which will transfer control to the real-time scheduler by writing a command directly in the command register for the APIC 202 that instructs the APIC 202 to issue an MI or NMI (i.e., a hardware interrupt) to the CPU 204. Alternatively, this could be accomplished by assigning a new hexadecimal value to the counter 200. For example, assigning a value of 0xFFFFFFFF would trigger a thread switch in one cycle or, assigning a value of 0x00000000 might trigger an immediate switch by causing the counter 200 and APIC 202 to each issue an MI or NMI. However, this approach overwrites the value in the performance counter 200. Still another approach would be to issue a software MI or NMI to the CPU. However, the timing on software interrupts is different from hardware interrupts. Further, since this MI or NMI would be a software interrupt, a different hardware MI or NMI could interrupt the ISR. Note that the current embodiment of the invention uses a software interrupt to transfer control to the real time scheduler as it is faster than writing to the local apic hardware.

As discussed above with respect to FIGS. 3–5, the present invention enables a non-real-time operating system to perform real-time scheduling of CPU resources. Again, this is accomplished by treating the operating system as a real-time thread. The invention then executes each real-time thread running on the CPU for its corresponding portion of the time slot. When the portion of time corresponding to one thread expires, the next real-time thread is executed until its portion of time expires. Every time slot is split into varying length slices of time—each of which correspond to the percentage of CPU reserved for that thread. Note that the real-time thread used by the operating system gets all the cycles not used by the other real-time threads. That is, a thread may Yield execution before it has used all of its reservation. In that case, the windows real-time thread will pick up the execution time yielded. Note that using variable sized slices of time is also very different from how most traditional schedulers work—they almost invariably use a fixed time slice, and simply choose which thread should get the next fixed size time slice.

Figure 6:
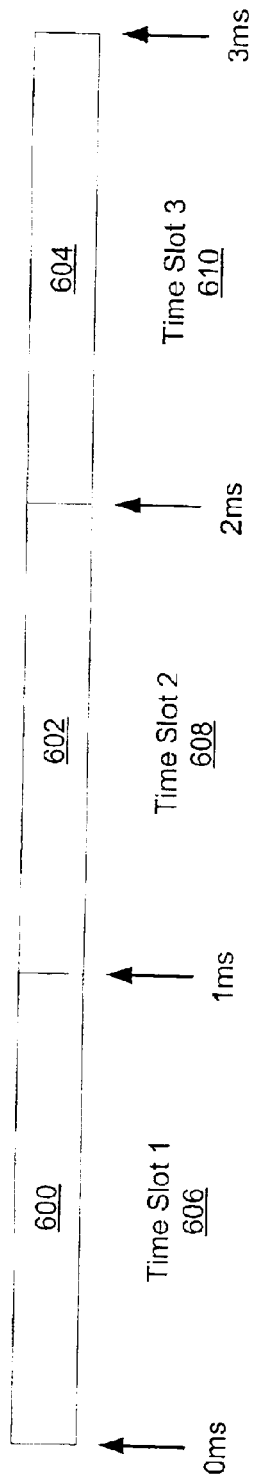
FIG. 6 depicts time slots during which a CPU can execute instructions.
Figure 7:
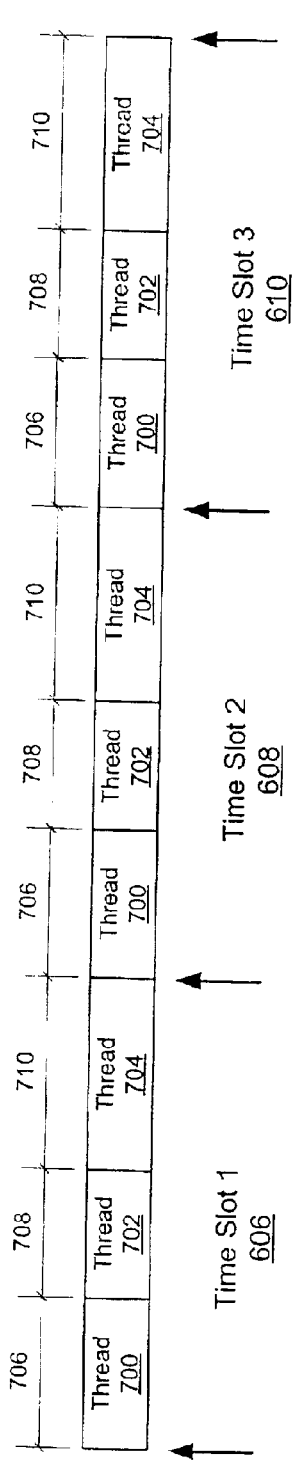
FIG. 7 depicts time slots during which CPU resources are allocated to a plurality of threads.
Figure 8:
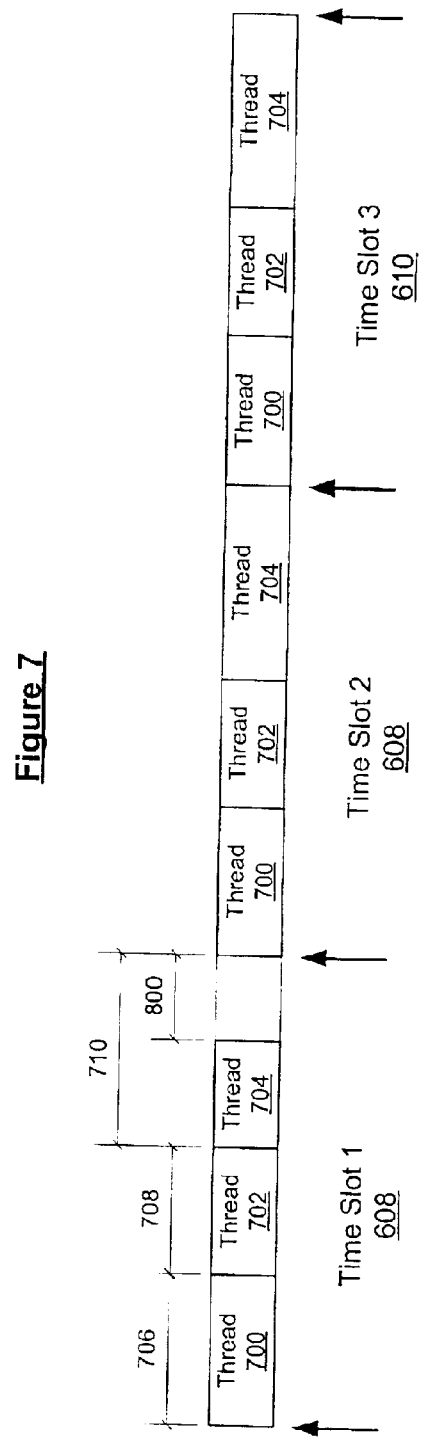
FIG. 8 depicts time slots during which CPU resources are allocated to a plurality of threads and where one of the threads does not use its entire allocated portion of the time slot because it is blocked on a synchronization object. (ie: a spinlock).

This is illustrated in FIGS. 6–8. In FIG. 6, three time slots 600, 602, 604 are depicted. Again, each time slot is a periodic amount of time during which a CPU can execute instructions. The time slot can be any amount of time such as, for example, 1 ms, which is shown in FIGS. 6–8. Skilled artisans will appreciate that the time slot can be defined or otherwise set up in a variety of ways. Preferably, the present invention defines the time slot to be a predetermined period of time (e.g., 1 ms).

In FIG. 7, the CPU is executing three threads 700, 702, 704 in each time slot 600, 602, 604. In particular, thread 700 runs until its portion 706 of the time slot expires. The method of FIG. 4 is then used to switch execution to thread 702, which then runs until its portion 708 of the time slot expires. Similarly, the method of FIG. 4 is then used to switch execution to the next real-time thread, thread 704, which then runs until its portion 710 of the time slot expires. By using this approach to schedule CPU resources, the present invention guarantees each real-time thread that it will be allocated CPU resources for at least a portion of each time slot.

Skilled artisans will understand that the portion of the time slot allocated to any given real-time thread could be determined by many different methods. Preferably, the process corresponding to the real-time thread will request that it be allocated a certain portion of the time slot or a certain percentage of CPU resources periodically. Alternatively, processes may not have an understanding as to how much CPU resources they need or what portion of the time slot they will require. Consequently, the portion of the time slot to be allocated can be dynamically determined based on historical use of the CPU resources by the real-time thread.

This could be implemented by allowing the process/thread to identify a probability of missing a deadline. For example, the thread could declare to the present invention that it does not know the amount of CPU resources that it will require, but that it can tolerate a x% probability of missing a deadline. So, if the thread declares that it can tolerate missing one deadline every thousand periods (i.e., 1/1000), then present invention could assign a portion of the time slot (i.e., period) to the thread. If the thread misses its deadline more than once every thousand periods, then the present invention could increase the thread's portion of the time slot. Similarly, if the portion of the time slot could be decreased if the rate of missing deadlines is smaller than the declared tolerance value.

Figure 9:
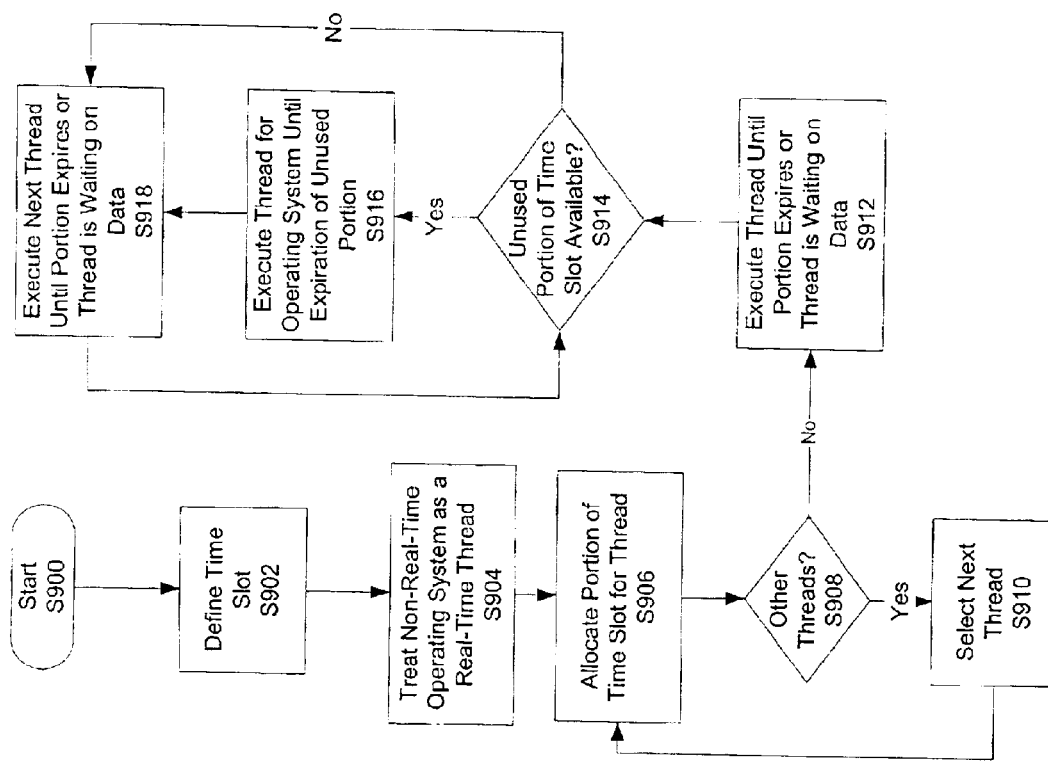
FIG. 9 is a flow chart that illustrates an exemplary method of guaranteeing CPU resources in a non-real-time operating-system environment.

FIG. 9 generally illustrates the above-referenced method of guaranteeing CPU resources in a non-real-time operating-system environment. After starting S900 the invention, the periodic time slot 600, 602, 604 during which real-time threads will guaranteed CPU resources is defined S902. The non-real-time operating system is then treated as a real-time thread S904. Consequently, a portion of the time slot is allocated to the real-time thread for the non-real-time operating system S906. If there are other real-time threads that require CPU resources S908, then the next thread is selected S910 and portions of the time slot are allocated for those threads as well S906. Otherwise, a real-time thread (e.g., thread 704) is executed until its portion expires or the thread is waiting on a synchronization object and therefore cannot proceed S912.

If thread 704 is waiting on data synchronization object S914, then the remaining unused portion of the time slot is preferably utilized by another thread S918. This is depicted in FIG. 8, where thread 704 does not use its allocated portion 710 of the time slot 606 because it is waiting on a synchronization object and therefore yields the unused remaining portion 800 of the time slot 606. The present invention can then allocate this remaining portion 800 to another thread such as, for example, the thread for the operating system, which is then executed until expiration of the remaining portion 800 of the time slot S916. This enables the CPU resources to be in constant use whenever there is a thread to be executed—as opposed to allowing the CPU sit idle when there is work to be performed. If, as shown in FIG. 7, the thread (e.g., 704) is not waiting on a synchronization object and instead the thread (e.g., 704) used the entirety of its allocated portion S914, then the next thread (e.g., 700) is similarly executed until expiration of its portion of the time slot or until the thread (e.g., 700) blocks on a synchronization object S918.

Thus, if a non-real-time operating system is treated as a real-time thread such as, for example, thread 700, then the present invention will enable the non-real-time operating system to perform real-time scheduling of CPU resources. Further, the present invention will guarantee allocation of CPU resources in every time slot to real-time threads. The only exception to this, of course, is when a real-time thread is blocked on a synchronization object, in which case its portion or unused portion of the time slot will be utilized by another thread.

The current invention uses 2 different interrupt sources to drive the real-time scheduler. A maskable interrupt that is generated by the local APIC timer, and which has a period that defines the length of the time-slot. Currently that period is set to 1 ms but clearly that can be modified as required. At the start of every timeslot the local APIC timer interrupt fires and takes control away from windows—and disables interrupts in the process. The real-time scheduler then switches control to the first real-time thread, and loads the performance counters with a value that will cause an interrupt to fire the appropriate fraction of a time-slot later. The performance counter interrupt is unmasked, and it is programmed to fire a non maskable interrupt. Control is then transferred to the real-time thread, and is regained when the performance counter NMI fires. The real time scheduler then selects the next real-time thread to run if any, and programs the performance counters to fire at the appropriate fraction of a time-slot for that thread, and again transfers control to the second real-time thread. This continues until all real-time threads have been run, at which time, the performance counter interrupts are masked, and the local APIC timer interrupt is unmasked, and control is transferred to windows, at which time, interrupts are reenabled, since they had to be enabled for us to get control in the first place. In this way, interrupts stay disabled the whole time we are switching between multiple real-time threads, during the fraction of a millisecond that they have each allocated. When they have all run, control goes back to windows which gets whatever time is remaining in that time-slot—when it will lose control again to the next local APIC timer interrupt.

Figure 10:
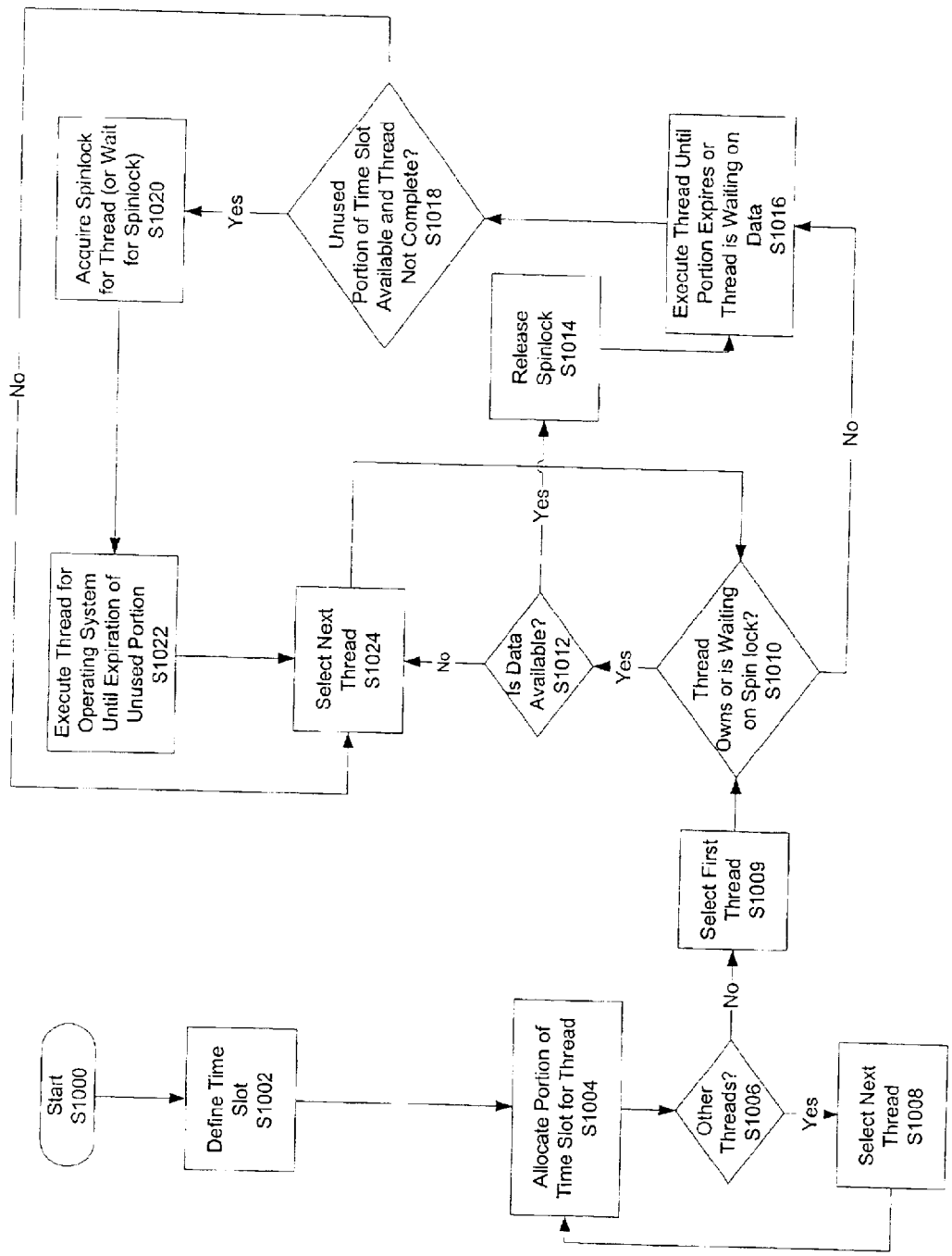
FIG. 10 is a flow chart illustrating an exemplary method by which a machine can schedule CPU resources such that real-time threads can synchronize with each other and since the Windows OS is treated as a single real-time thread—they can also synchronize with non real-time Windows driver code. Note that the current embodiment was implemented for uni-processor machines. The design can be extended to multi-processor machines as well.

Another benefit of the present invention is that it enables synchronization between real-time threads, and between real-time and non real-time Windows threads through the support of Windows synchronization objects. The synchronization objects currently supported are spinlocks. This is shown in FIG. 10. After starting S1000, a time slot for which said CPU resources are to be allocated is defined S1002. Portions of the time slot are allocated for each real-time thread S1004, S1006, S1008. The first thread to be executed is selected S1009.

The present invention then determines whether the thread owns (or is waiting for) a spinlock S1010, which is used in order to determine whether a given thread is blocked or runnable. The thread is waiting on data and the data is available S1012, then the spinlock is released S1014 and the thread is executed until its portion of the time-slot expires or it again tries to acquire an already held spinlock S1016. If the spinlock was not available S1012, the thread continues to wait and the next thread is selected S1024, after which the process repeats.

After execution of the thread until its portion expires or the thread is waiting on data S1016, the present invention determines whether the thread used its portion of the time slot S1018. If not, or if the thread has terminated, then the next thread is selected S1024. However, if the thread did not use its entire portion of the time slot and the thread has not terminated, then the thread is waiting on data before it can proceed. Consequently, the thread acquires a spinlock, or if the spinlock is already owned, the thread waits on the spinlock S1020. The thread for the operating system (or another thread) is then executed until expiration of the unused portion of the time slot S1022, after which the next thread is then selected S1024.

Commented source code illustrative of how to implement the synchronization of real-time threads is attached in sections of the Appendix that are labeled spinlock.c, rtinfo.h and rt.h. Also included is the core thread switching code that runs whenever threads are switched.

In sum, the present invention overcomes the limitations and problems of the prior art by preferably using a performance counter to count unhalted cycles or instructions executed on the CPU. After a determined number of cycles or instructions transpire, the performance counter issues a maskable or non-maskable interrupt (i.e., a MI or NMI) to a programmable interrupt controller (PIC), such as an APIC on an Intel x86 CPU or an OpenPIC on a Cyrix or AMD CPU. Issuance of the interrupt triggers execution of the scheduler, and thus, switches thread execution on a real-time basis. In addition, the disclosed methods and computer-executable components overcome the limitations of the prior art by: (a) scheduling CPU resources such that real-time threads are guaranteed respective portions of time slots, (b) providing real-time scheduling on a non-real-time operating system, and (c) allowing synchronization between real-time threads as well as non real-time threads through the support of Windows synchronization objects. (Such as spinlocks.).

The present invention has been described herein with reference to specific exemplary embodiments thereof. It will be apparent to those skilled in the art, that a person understanding this invention may conceive of changes or other embodiments or variations, which utilize the principles of this invention without departing from the broader spirit and scope of the invention as set forth in the appended claims. All are considered within the sphere, spirit, and scope of the invention. The specification and drawings are, therefore, to be regarded in an illustrative rather than restrictive sense. Accordingly, it is not intended that the invention be limited except as may be necessary in view of the appended claims.

APPENDIX

Source code for "spinlock.c"

```c
#include "rtinfo.h"
#pragma warning (disable : 4142)
#include "rt.h"
#pragma warning (default : 4142)

// The following values are used to help detect improperly initialized spinlocks.

#define INITIALSPINLOCKVALUE 0xabac929c
#define INITIALWINDOWSTHREADPOINTER 0xd79df880

// We need to make the Acquire and Release spinlock calls safe for real time threads. We do this by acquiring
// the spinlock. We have to acquire spinlocks now since real time threads can run when normal windows threads
// are running at raised irql.

// We detect if we are being called from a real-time thread or a windows thread by looking at CS. If CS is equal
// to the real-time CS then we are being called from a real-time thread otherwise we assume we are
// being called from a windows thread.

ULONG InitialWindowsThread=INITIALWINDOWSTHREADPOINTER;
ULONG RtCs=0;
volatile CHAR *ApicBase=NULL;
// We initialize pCurrentRtThread, so that it is a valid pointer. That
// way we can use one code path through KfAcquireLock and KfReleaseLock.
// When rt.sys is not loaded and has not initialized pCurrentRtThread, then
// it will point to a zero variable, since RtCs defaults to zero. When
// rt.sys initializes these variables, it loads RtCs LAST and it currently
// does. Since that initialization is done at passive level, there are
// no spinlocks acquired in the system. Furthermore when pCurrentRtThread
// is updated - we will atomically switch to putting real thread identifiers
// into the spinlocks - from the initial behavior that just loads ones and
// zeros into the lock. We update pCurrentRtThread pointer before we
// change RtCs - in rt.sys.
volatile ULONG *pCurrentRtThread=&InitialWindowsThread;
BOOL (*TransferControl)(WORD State, ULONG Data, BOOL (*DoTransfer)(PVOID), PVOID Context)=NULL;
VOID (*ForceAtomic)(VOID (*AtomicOperation)(PVOID), PVOID Context)=NULL;

NtRtData NtInfo={NULL, NULL, NULL, NULL, NULL};

pNtRtData _cdecl NtKernRtInfo(VOID)
{

NtInfo.pRtCs=&RtCs;
NtInfo.pBase=&ApicBase;
NtInfo.pThread=&pCurrentRtThread;
```

```
NtInfo.pFunction1=&TransferControl;
NtInfo.pFunction2=&ForceAtomic;

return &NtInfo;

}

NTKERNELAPI
VOID
NTAPI
KeInitializeSpinLock(
   IN PKSPIN_LOCK SpinLock
   )
{
   *SpinLock = INITIALSPINLOCKVALUE;
}

BOOL True(PVOID Context)
{ return TRUE;

} pragma warning( disable : 4035 )

// If value==*destination, then *destination=source and function returns
// true. Otherwise *destination is unchanged and function returns false.

ULONG __inline CompareExchange(ULONG *destination, ULONG source, ULONG value)
{

ASSERT( destination!=NULL );
ASSERT( source!=value );

__asm {
        mov eax,value
        mov ecx,source
        mov edx,destination
        lock cmpxchg [edx],ecx
        mov     eax,0
        jnz done
        inc eax
done:
        }

} pragma warning( default : 4035 )
```

```
/*
To enable real-time threads to be switched out while they are holding spinlocks,
I had to extend the significance and use of the KSPIN_LOCK variable.

Previous NT spinlock code only ever sets or clears the bottom bit of a spinlock. Previous 9x spinlock code
never touched the spinlock at all, since 9x is a uniprocessor platform - spinlocks simply raised and lowered irql.
Here, that is no longer true.

The bottom 2 bits (bits 0 and 1) mean the following

If bit 0 is set, the spinlock is claimed. This is compatible with existing NT usage.
If bit 1 is set, the spinlock has a next in line claim.

The bottom 2 bits can transition between the following states:

00 -> 01    ; spinlock free -> spinlock claimed
01 -> 00    ; spinlock claimed -> spinlock free
01 -> 11    ; spinlock claimed -> spinlock claimed and next in line claimed
11 -> 10    ; spinlock claimed and next in line claimed -> spinlock not claimed and next in line claimed
10 -> 01    ; spinlock not claimed and next in line claimed -> spinlock claimed The top 30 bits hold a real-time thread handle. They identify which real-time thread is either holding the lock or
is next in line.

If bit 1 is set, then the top 30 bits identify the next in line thread otherwise the top 30 bits identify the current
owner.

Normally we have the following state transitions:

00->01 followed by 01->00

That is the no contention for the lock case.

Otherwise we have the following sequence:

00->01, 01->11, 11->10, 10->01 after which we can have either 01->00 or 01->11

*/ typedef struct {
  PKSPIN_LOCK SpinLock;
  ULONG YieldToThisThread;
} YIELDINFO, *PYIELDINFO;

BOOL NextInLine(PVOID Context)
{
```

```
PYIELDINFO YieldInfo=(PYIELDINFO)Context;

return CompareExchange(YieldInfo->SpinLock, 3|*pCurrentRtThread, 1|(YieldInfo-
>YieldToThisThread&~(3)));

}

BOOL YieldToNextInLine(PVOID Context)
{

PYIELDINFO YieldInfo=(PYIELDINFO)Context;

return CompareExchange(YieldInfo->SpinLock, YieldInfo->YieldToThisThread&~(1), YieldInfo-
>YieldToThisThread);

}

VOID
FASTCALL
KfAcquireLock(
   IN PKSPIN_LOCK SpinLock
   )
{

YIELDINFO YieldInfo;
ULONG SpinCount;

SpinCount=0;

while (TRUE) { if (CompareExchange(SpinLock, 1|*pCurrentRtThread, INITIALSPINLOCKVALUE) ||
CompareExchange(SpinLock, 1|*pCurrentRtThread, 2|*pCurrentRtThread)) {
      // We got the spinlock. We're outa here.
      break;
   }

// If we get here, then someone else is holding the spinlock. We will
   // try to queue up after them and ensure that we get it next.
   YieldInfo.SpinLock=SpinLock;
   YieldInfo.YieldToThisThread=*(volatile ULONG *)SpinLock;

// Make sure the spinlock is not currently free.
   if (YieldInfo.YieldToThisThread==INITIALSPINLOCKVALUE) {
      continue;
   }

// Make sure that someone is NOT trying to acquire a spinlock they already
```

```
// acquired.
if (((YieldInfo.YieldToThisThread^*pCurrentRtThread)&~(3))==0) {
   // Someone is trying to acquire a spinlock more than once.
   if (!RtThread()) {
      DbgPrint("BugCheck 0xf: Acquiring already owned spinlock 0x%x.\n", SpinLock);
   }
   Break();
   break;
}

// Make sure the spinlock is not in an invalid state.
// ie: Make sure it has been initialized properly.
if ((YieldInfo.YieldToThisThread&(3))==0 ||
   !(YieldInfo.YieldToThisThread&~(3))) {
   // Spinlock has either been trashed, or was not initialized properly.
   if (!RtThread()) {
      DbgPrint("BugCheck 0x81: Invalid spinlock state 0x%x.\n", SpinLock);
   }
   Break();
   break;
} if (TransferControl!=NULL) {
   // Try to claim the lock next - so that we will get
   // Yielded to when the lock is released.

if ((*TransferControl)(BLOCKEDONSPINLOCK, YieldInfo.YieldToThisThread, NextInLine, &YieldInfo)) {
      // We successfully queued up to get control when the lock is released,
      // and we updated our state atomically and transferred control up to the
      // real-time executive.
      if (!RtThread()) {
         // Windows thread. We allow windows threads to get switched to even
         // when they are blocked on a spinlock so that interrupts can be
         // serviced.
         while (*SpinLock!=(2|*pCurrentRtThread)) {
            // If we get here, then the spinlock is still held by the real-time
            // thread, so we simply yield back again to it - now that interrupts
            // have all been serviced.
            if (SpinCount++>100) {
               Break();
            }
            (*TransferControl)(BLOCKEDONSPINLOCK, YieldInfo.YieldToThisThread, True, NULL);
         }
      } if (*SpinLock!=(2|*pCurrentRtThread)) {
         // If the spinlock doesn't have above state at this point, something is wrong.
         Break();
      }
      continue;
   }
   else {
```

```
    // We failed to get in line behind the owner. So, see if the owner
    // just released the lock.
    if (!SpinCount++) {
       continue;
       }
    else {

//Break(); - TURN OFF FOR NOW - ADD a test based on whether windows
       // or not.

// There must have been multiple threads queued up on this lock.
       // Yield.

// OR the other possibility is that we yielded the spinlock to windows
       // which is servicing interrupts before it marks the spinlock as ready
       // to be queued up on - so we are stuck waiting for Windows to get around
       // to the compare exchange where it claims the spinlock.
       (*TransferControl)(SPINNINGONSPINLOCK, YieldInfo.YieldToThisThread, True, NULL);
       }
    }

}
 else {
    // If we get here, then we are NOT running RT, and someone is trying to
    // acquire a held spinlock. That is a fatal error.
    // Break into debugger if present.
    DbgPrint("BugCheck 0xf: Acquiring already owned spinlock 0x%x.\n", SpinLock);
    Break();
    break;
    }

}

}

VOID
FASTCALL
KfReleaseLock(
   IN PKSPIN_LOCK SpinLock
   )
{

// Release the spinlock. Break if spinlock not owned.

if (!CompareExchange(SpinLock, INITIALSPINLOCKVALUE, 1|*pCurrentRtThread)) {

// If we get here, then someone queued up behind us and tried to acquire
   // the lock while we were holding it - and they yielded their processor
   // time to us, so we must yield back to them. The nice thing about this
   // is that this yield happens before IRQL is lowered - so when this is the
```

```
// windows thread we do not have to wait for all of the DPCs and preemtible
// events to be processed before the real-time thread waiting on the lock
// gets to run. He runs as soon as we yield, and when control again
// comes around to us, we can then continue on and lower irql.

if (TransferControl!=NULL) {

YIELDINFO YieldInfo;

YieldInfo.SpinLock=SpinLock;
    YieldInfo.YieldToThisThread=*SpinLock;

if ((YieldInfo.YieldToThisThread&3)!=3) {
        // It is an ERROR if we get here and both low order bits are not set
        // in the spinlock.
        if (!RtThread()) {
            DbgPrint("BugCheck 0x10: Releasing unowned spinlock 0x%x.\n", SpinLock);
        }
        Break();
        return;
    }

// Try to release the lock to the thread queued up behind us and then
    // transfer control to him and we're done. When he wakes up he will
    // claim the lock and someone else can get in behind him if needed.
    if ((*TransferControl)(YIELDAFTERSPINLOCKRELEASE, YieldInfo.YieldToThisThread,
YieldToNextInLine, &YieldInfo)) {
        return;
    }
    else {
        // It is an ERROR to get here. We should never fail to release
        // the thread blocked on us.
        Break();
    }

}
else {
    // We get here if the real-time executive is not running, but we could
    // not release the spinlock. That will only happen if either the spinlock
    // was not owned, or InitialWindowsThread or pCurrentRtThread have
    // been corrupted.
    DbgPrint("BugCheck 0x10: Releasing unowned spinlock 0x%x.\n", SpinLock);
    Break();
    }

}

}

NTKERNELAPI
KIRQL
```

```
FASTCALL
KfAcquireSpinLock(
    IN PKSPIN_LOCK SpinLock
    )
{

KIRQL OldIrql;

ASSERT( KeGetCurrentIrql() <= DISPATCH_LEVEL );

KeRaiseIrql( DISPATCH_LEVEL, &OldIrql );

KfAcquireLock(SpinLock);

return ( OldIrql );

}

NTKERNELAPI
VOID
FASTCALL
KefAcquireSpinLockAtDpcLevel(
    IN PKSPIN_LOCK SpinLock)
{

ASSERT( KeGetCurrentIrql() == DISPATCH_LEVEL );

KfAcquireLock(SpinLock);

}

NTKERNELAPI
KIRQL
FASTCALL
KeAcquireSpinLockRaiseToSynch(
    IN PKSPIN_LOCK SpinLock
    )
{

KIRQL OldIrql;

ASSERT( KeGetCurrentIrql() <= SYNCH_LEVEL );

KeRaiseIrql( SYNCH_LEVEL, &OldIrql );

KfAcquireLock(SpinLock);

return ( OldIrql );
```

}

```
NTKERNELAPI
VOID
FASTCALL
KfReleaseSpinLock(
  IN PKSPIN_LOCK SpinLock,
  IN KIRQL NewIrql
  )
{
```

// First release the spinlock.

KfReleaseLock(SpinLock);

// Set the new IRQL level.

ASSERT( NewIrql >= 0 && NewIrql < 32 );

KeLowerIrql( NewIrql );

}

```
NTKERNELAPI
VOID
FASTCALL
KefReleaseSpinLockFromDpcLevel (
  IN PKSPIN_LOCK SpinLock
  )
{
```

// Release the spinlock.

KfReleaseLock(SpinLock);

ASSERT( KeGetCurrentIrql() == DISPATCH_LEVEL );

}

Source code for core thread switch.

```c
VOID __declspec(naked) SwitchRealTimeThreads(VOID)
{

//LONG i;

// Paranoia: Make sure we are not being reentered.
__asm {
        push ds
        mov ds, cs:RealTimeDS
        inc SwitchRtThreadReenterCount
        cmp SwitchRtThreadReenterCount, 1
        pop ds
        jz notreentered
        int 3
notreentered:
        } ifdef DEBUG

// Paranoia: Make sure interrupts are disabled.

__asm {
        pushfd
        test dword ptr[esp], IF
        jz intsdisabled
        int 3
        and dword ptr[esp], ~(IF)
intsdisabled:
        popfd
        } endif

__asm { push eax
        mov eax, cs:currentthread
        cmp eax, cs:windowsthread
        jnz notwindows push ds
        mov ds, cs:RealTimeDS ifdef MASKABLEINTERRUPT mov eax, ApicIntrInterrupt
```

```
        test dword ptr[eax], MASKED
        jnz skippendinginterruptfix or dword ptr[eax], MASKED inc EnabledInterrupts
        cmp EnabledInterrupts, 1
        jz      enableok
        int 3 enableok:

mov eax, pCurrentIrql
        movzx eax, byte ptr[eax]
        mov OriginalIrql, eax cmp eax, DISPATCH_LEVEL
        jge irqlok
        mov eax, pCurrentIrql
        mov byte ptr[eax], DISPATCH_LEVEL irqlok:

sti
        nop
        nop
        nop
        nop
        cli skippendinginterruptfix:

endif sidt WindowsIDT
        pop ds
notwindows:
        pop eax
        }

LoadIDT(RtExecIDT);

__asm {
        push ds
        mov ds, cs:RealTimeDS
        }

SaveIDT(DebugIDT);    // Make sure we put back correct IDT in exception handlers.

__asm {
        pop ds
```

}

SaveEAX();

LoadRtDS();

HoldOriginalDS();

LoadThreadStatePointer();

SaveSegmentState();

SaveRegisterState();

SaveOriginalDS();

SaveThreadStack();

SetupStack();

StopPerformanceCounters();

// Save Irql for thread we are leaving.
// To do this we directly read the memory in ntkern that holds current irql.
currentthread->irql=*pCurrentIrql;

if DEBUG
//*ApicTimerInterrupt=ApicTimerVector|MASKED|PERIODIC;
endif

// After this point it is safe to run essentially any code we want.
// The stack is setup so straight c will work properly, and the
// scheduler interrupt is turned off.

// Note that we should check for reentrancy on this interrupt. We can
// do that really easily by having a separate IDT for the rt executive.
// We load that when we enter this routine, we load the windows IDT when
// we exit this routine and return to windows, and we load the rt threads
// IDT when we exit this routine running a real time thread.

// That will make it easy to isolate exceptions caused by the RT executive
// versus exceptions caused by real time threads.

//Trap();

// Make sure that we do not have any ISR in APIC other than our own.
// Make sure no IRR in APIC - otherwise we have been held off.

```
// Check for cases when we have stopped in the debugger on an int 3 in
// a realtime thread and have loaded the windows idt.

// Nasty case when we iret back from switchrealtime threads to an int 3 itself
// should be considered
// we have to make absolutely sure that no interrupts get processed while
// we are running the realtime thead. In that case ints may stay disabled
// the whole time until after the windows idt is loaded.

if (currentthread!=windowsthread) { ifdef MASKABLEINTERRUPT

// Make sure that interrupts are enabled on this realtime thread. Again
        // they may not be if we hit an int 3 and transfered control to the
        // debugger. If they are disabled, then reenable them for the next
        // switch into that thread.

// Trap in debug if they are disabled and we did not log an int 3 hit in
        // the code.

// First make sure that we got here on an RtpTransferControl.
        if (*(WORD *)(*(ULONG *)(currentthread-
>esp+EIPRETURNADDRESSOFFSET*sizeof(ULONG)))-
2)==(0xcd|(TRANSFERCONTROLIDTINDEX<<8))) {

// We got here on an RtpTransferControl. Check the flags that got pushed
                // in that routine before the CLI, so that we check the real state of the
                // rt thread's interrupt flag.
                if (((ULONG *)(currentthread->esp))[RTPTRANSFERCONTROLFLAGSOFFSET]&IF) {
                        // Realtime thread has interrupts ENABLED!
                        // We better not think that we hit an int 3.
                        #ifdef DEBUG
                        if (HitInt3InRtThread) {
                                Trap();
                        }
                        #endif
                }
                else {
                        // Realtime thread has interrupts DISABLED!
                        // Reenable them, and make sure we hit an int 3.
                        ((ULONG *)(currentthread-
>esp))[RTPTRANSFERCONTROLFLAGSOFFSET]|=IF;
                        #ifdef DEBUG
                        if (!HitInt3InRtThread) {
                                Trap();
                        }
                        else {
                                HitInt3InRtThread=0;
                        }
                        #endif
```

```
                }
        }
endif

// Now make sure that our IRQL is never lower than DISPATCH_LEVEL.
        if (currentthread->irql<DISPATCH_LEVEL) {
                Trap();
        }
} if (currentthread==windowsthread) { ifdef MASKABLEINTERRUPT
        HandleWindowsInterrupt.offset=0;
        #endif // If the current thread is windows, then save CR0.
        // Then we can properly restore CR0 when we return to windows.

LastWindowsCR0=ReadCR0();

#ifdef DEBUG

// Make sure that the APIC interrupt is programmed properly.

if (!((*ApicPerfInterrupt)&NMI)) {
                #ifndef MASKABLEINTERRUPT
                Trap();
                #endif
                }
        else {
                #ifdef MASKABLEINTERRUPT
                Trap();
                #endif
                } endif

// If the ISR bit is set for our maskable interrupt then we need to
        // clear it.

// We only EOI the APIC if our ISR bit is set.

if (ReadAPIC(0x100+(ApicTimerVector/32)*0x10)&(1<<(ApicTimerVector%32))) {
```

// We have to EOI the APIC for non NMI based interrupts.
WriteAPIC(APICEOI,0);

}
ifdef DEBUG
else {

// Our ISR bit was not set. We better have gotten here with a software interrupt.

// If we did not get here on a software interrupt instruction, then
// trap. This way of checking will work regardless of the routine
// used to transfer control. As long as an interrupt instruction is used
// to give us control.

if (*(WORD *)((*(ULONG *)(windowsthread->esp+EIPRETURNADDRESSOFFSET*sizeof(ULONG)))-2)!=(0xcd|(TRANSFERCONTROLIDTINDEX<<8))) {
Trap();
}

}
endif ifdef DEBUG if (ReadAPIC(0x100+(ApicTimerVector/32)*0x10)&(1<<(ApicTimerVector%32))) {

Trap();

} endif

} ifdef DEBUG

// Current thread is NOT a windows thread.
// In this case the APIC interrupt should be programmed to
// be NMI, and interrupts MUST be masked. It is a FATAL
// error to unmask interrupts while inside a real time thread.

else { if (!((*ApicPerfInterrupt)&NMI)) {
ifndef MASKABLEINTERRUPT
Trap();
endif
}
else {
ifdef MASKABLEINTERRUPT
Trap();

```
            #endif
        }

// I need to decide if I got here on RtpTransferControl or not.
    // If I did, then the interrupt flag I need to check is at a different
    // location on the stack.

if (*(WORD *)((*(ULONG *)(currentthread-
>esp+EIPRETURNADDRESSOFFSET*sizeof(ULONG)))-
2)!=(0xcd|(TRANSFERCONTROLIDTINDEX<<8))) {

// This was not an RtpTransferControl. It was a hardware NMI.
            if (((ULONG *)(currentthread->esp))[EFLAGSOFFSET]&IF) {
                    // Realtime thread has interrupts ENABLED! Fatal Error!
                    // Everything is dead at this point. We really need to
                    // make it essentially impossible for real time threads
                    // to enable interrupts.
                    #ifndef MASKABLEINTERRUPT
                    Trap();
                    #endif
                }
            else {
                    #ifdef MASKABLEINTERRUPT
                    Trap();
                    #endif
                }

}
    else {

// We got here on an RtpTransferControl. Check the flags that got pushed
            // in that routine before the CLI, so that we check the real state of the
            // rt thread's interrupt flag.
            if (((ULONG *)(currentthread->esp))[RTPTRANSFERCONTROLEFLAGSOFFSET]&IF) {
                    // Realtime thread has interrupts ENABLED! Fatal Error!
                    // Everything is dead at this point. We really need to
                    // make it essentially impossible for real time threads
                    // to enable interrupts.
                    #ifndef MASKABLEINTERRUPT
                    Trap();
                    #endif
                }
            else {
                    #ifdef MASKABLEINTERRUPT
                    Trap();
                    #endif
                }

}

} endif
```

```
#ifdef DEBUG

// Make sure the enable floating point MMX instructions bit is set in CR4.
// If not, then the fxsave and fxrstor instructions will not work properly.

if ((CPUFeatures&FXSR) && !(ReadCR4()&OSFXSR)) {

Trap();

} endif

// The following code is for detecting how the IDT and CR0 are
// used by the OS.

#if defined(DEBUG) && 0

// This is monitoring code to see if anyone else in the system
// is swaping IDTs.

// This means that we will need to SAVE the 9x IDT BEFORE we
// blast in a new value.  Otherwise we will crash the OS since
// we will blow away an IDT and restore it improperly.  What
// a pain.

SaveIDT(WindowsIDT);

if (WindowsIDT!=LastWindowsIDT) {
        Trap();
        }

LastWindowsIDT=WindowsIDT;

{
ULONG currentCR0;

currentCR0=ReadCR0();

// The MP bit should always be set.
if (!(currentCR0&FPUMONITOR)) {
        Trap();
        }

// The EM bit should never be set.
if (currentCR0&FPUEMULATION) {
        Trap();
        }
```

```
// The TS bit should never be set.
if (currentCR0&FPUTASKSWITCHED) {
        Trap();
        }

// The ET bit should always be set.
if (!(currentCR0&FPU387COMPATIBLE)) {
        Trap();
        }

// The NE bit must ALWAYS be set. This is REQUIRED, since we will run realtime threads
// with interrupts masked, so an external interrupt will NOT fire. We MUST have the
// internally generated exception.
if (!(currentCR0&FPUEXCEPTION)) {
        Trap();
        }

} endif ifdef DEBUG
// Make sure performance counters are not moving.
if (ReadPerformanceCounter(0)!=ReadPerformanceCounter(0)) {
        Trap();
        }
endif // The following test is broken because new PIIs update information
// in the 40-48 bit range. We need to fix this test so it works
// correctly on all processors. Intel (old and new) and AMD.
#if 0
// Make sure both performance counters are positive.
if ((ReadPerformanceCounter(0)&0x0000008000000000) ||
        (ReadPerformanceCounter(1)&0x0000008000000000)) {
        Trap();
        }
endif ifdef DEBUG

// Make sure that no APIC errors have been logged.
// Before reading the APIC status, we must write to the register
// first. That updates it with the most recent data which we then
// read. We do not need to clear the register after reading.
// The next time we write, it will latch any new status which we
// will then read.
{
ULONG ApicStatus;
WriteAPIC(APICSTATUS,0);
```

```
if (ApicStatus=ReadAPIC(APICSTATUS)) {
        ApicErrorHistogram[ApicStatus&MAXAPICERRORHISTOGRAM]++;
        Trap();
        }
} endif

// See if CR0 has changed since the last interrupt.

#if 0
// If we are switching between realtime threads double check
// that the CR0 floating point state is correct. Trap if not.

if (currentthread!=windowsthread && ) {
        Trap();
        }
endif

// At this point we save the floating point state if required.

if (currentthread->FloatState!=NULL) {

// If there is more than 1 thread using FLOAT or MMX, then
        // we need to save the current thread's floating point state.

if (activefloatthreadcount>1) {

ULONG currentCR0;
                ULONG fpubits;

currentCR0=ReadCR0();

// If CR0 has either the TS or EM bit set, then clear those
                // bits in CR0 so we can save the floating point state without
                // causing an exception.
                // Trap if clearing the bits fails.
                if (fpubits=(currentCR0&(FPUTASKSWITCHED|FPUEMULATION))) { currentCR0^=fpubits;
                        WriteCR0(currentCR0);

if DEBUG if (currentCR0^ReadCR0()) {
                                Trap();
                                } endif

}
```

- 47 -

```
            SaveThreadFloatState(currentthread->FloatState);
        }
    } if (YIELD==currentthread->state) {
        // Save away the mark and time for this thread.
        currentthread->Mark=((PYIELDTIME)(currentthread->data))->Mark;
        currentthread->Delta=((PYIELDTIME)(currentthread->data))->Delta;
}

// I need to have a complete set of statistics on all of the threads
// available to the scheduler - so it can make a good decision about what
// thread to run. That means I have to log the threadswitchtime and update
// the current thread's duration BEFORE I actually do the switch itself.

// Log threadswitch time.
lastthreadswitchtime=RtTime();

// Update just switched out thread's duration.
currentthread->Statistics->DurationRunThisPeriod+=lastthreadswitchtime-currentthread->Statistics-
>ThisTimesliceStartTime;

// Now we record last thread and switch to the next thread to run.
lastthread=currentthread;

if (YIELDAFTERSPINLOCKRELEASE==currentthread->state) {
        if ((currentthread->data&3)!=3) {
                Trap();
        }
        currentthread->data&=~(3);
        if (YIELDAFTERSPINLOCKRELEASE==((ThreadState *)currentthread->data)->state ||
                YIELD==((ThreadState *)currentthread->data)->state ||
                EXIT==((ThreadState *)currentthread->data)->state ||
                DEAD==((ThreadState *)currentthread->data)->state) {
                Trap();
        }
        // Update state of currentthread to RUN.
        currentthread->state=RUN;
        // Just unblocked thread is now current thread to run.
        currentthread=(ThreadState *)currentthread->data;
        // Update the state of the just unblocked thread so that it can run.
        currentthread->state=RUN;
        goto nextthreadselected;
}
```

```
loopcount=0;

nextthread:
currentthread=currentthread->next;

if (loopcount++>1000) {
        Trap();
} if (currentthread!=windowsthread && (BLOCKEDONSPINLOCK==currentthread->state /*||
        SPINNINGONSPINLOCK==currentthread->state*/)) {
        // We allow switching back to windows even when it is blocked on a
        // spinlock so that interrupts can get serviced.
        // All other threads will never get switched to while they are blocked
        // or spinning on a spinlock.
        goto nextthread;
} if (YIELD==currentthread->state) {
        if ((lastthreadswitchtime-currentthread->Mark)>=currentthread->Delta) {
                // We can run this thread. It has finished its Yield.
                currentthread->state=RUN;
        }
        else {
                // This thread is not runnable. Make sure that we are not trying
                // to run it because it is holding a spinlock and is thus holding
                // off some other thread. For now, just trap if that is the case.
                if (lastthread!=windowsthread &&
                        BLOCKEDONSPINLOCK==lastthread->state &&
                        (ThreadState *)(lastthread->data&~(3))==currentthread) {
                        Trap();
                }
                goto nextthread;
        }
} nextthreadselected:

// Now that we have the next thread to run, increment thread switch count.

threadswitchcount++;

// Update new thread statistics.
currentthread->Statistics->TimesliceIndex++;
currentthread->Statistics->ThisTimesliceStartTime=lastthreadswitchtime;
if (currentthread->Statistics->ThisPeriodStartTime==0) {
```

```
                currentthread->Statistics->ThisPeriodStartTime=lastthreadswitchtime;
        }
if ((lastthreadswitchtime-currentthread->Statistics->ThisPeriodStartTime)>currentthread->Statistics->Period) {
        // We have entered a new period.
        // Update starttime and index.
        currentthread->Statistics->ThisPeriodStartTime+=currentthread->Statistics->Period;
        currentthread->Statistics->PeriodIndex++;
        // Make sure we haven't dropped periods on the floor. If so, jump to current
        // period.
        if ((lastthreadswitchtime-currentthread->Statistics->ThisPeriodStartTime)>currentthread->Statistics->Period) {
                ULONGLONG integralperiods;
                integralperiods=(lastthreadswitchtime-currentthread->Statistics->ThisPeriodStartTime)/currentthread->Statistics->Period;
                currentthread->Statistics->ThisPeriodStartTime+=integralperiods*currentthread->Statistics->Period;
                currentthread->Statistics->PeriodIndex+=integralperiods;
        }
        currentthread->Statistics->TimesliceIndexThisPeriod=0;
        currentthread->Statistics->DurationRunLastPeriod=currentthread->Statistics->DurationRunThisPeriod;
        currentthread->Statistics->DurationRunThisPeriod=0;
}
currentthread->Statistics->TimesliceIndexThisPeriod++;

// Now restore the new threads floating point state if required.

if (currentthread->FloatState!=NULL) {

// If there is more than 1 thread using FLOAT or MMX, then
        // we need to restore the current threads state.

if (activefloatthreadcount>1) {

ULONG currentCR0;
                ULONG fpubits;

currentCR0=ReadCR0();

// If CR0 has either the TS or EM bit set, then clear those
                // bits in CR0 so we can save the floating point state without
                // causing an exception.
                // Trap if clearing the bits fails.
                if (fpubits=(currentCR0&(FPUTASKSWITCHED|FPUEMULATION))) { currentCR0^=fpubits;
                        WriteCR0(currentCR0);

if DEBUG if (currentCR0^ReadCR0()) {
                                Trap();
```

```
                }
        #endif
            }
            RestoreThreadFloatState(currentthread->FloatState);
        }
    } if 0
if (currentthread==windowsthread && activefloatthreadcount>1) {
        // Windows thread is being switched back in.
        // Restore CR0. Most critical is the ts bit.
        ULONG currentCR0;

currentCR0=ReadCR0();

// The TS bit should currently NEVER be set when we switch from realtime
        // threads back to Windows.
        if (currentCR0&FPUTASKSWITCHED) {
                Trap();
        }

// The EM bit should currently NEVER be set when we switch from realtime
        // threads back to Windows.
        if (currentCR0&FPUEMULATION) {
                Trap();
        }

// The NE bit must ALWAYS be set when we switch from realtime to Windows.
        // NOTE: this is another CR0 bit that should be RESTORED!
        if (!(currentCR0&FPUEXCEPTION)) {
                Trap();
        }

// Check if the TS bit state is different from its state when we left Windows.
        if ((currentCR0^LastWindowsCR0)&FPUTASKSWITCHED) {
                Trap();
                // Switch TS back to the state it was when we took control from Windows.
                currentCR0^=FPUTASKSWITCHED;
        }

// See if any other bits have changed. There shouldn't be any other bits that
        // change unless the debugger is mucking around.
        if (currentCR0^LastWindowsCR0) {
                Trap();
        }

}
```

```
#endif

// Setup to load CR0.
NextCR0=ReadCR0();

// Now make sure CR0 state has correct defaults for this thread.
// If thread does not use FP or MMX, then EM=1. Otherwise EM=0.
// NE=1, ET=1, TS=0, MP=1 are other default settings.

// Set desired defaults.
NextCR0&=~(FPUMASK);
NextCR0|=FPUEXCEPTION|FPU387COMPATIBLE|FPUMONITOR;
if (currentthread->FloatState==NULL) {
        // Turn on traps for FP or MMX instructions in non MMX/FP threads.
        // We do this only when IDT switching is turned on since we do
        // NOT want to cause traps or faults that might confuse windows.
        NextCR0|=FPUEMULATION;
        }

// If we current thread is windows, then make sure we restore
// CR0 to the state it had when we took control from windows.

if (currentthread==windowsthread) {
        NextCR0=LastWindowsCR0;
        }

NextIDT=RtThreadIDT;
if (currentthread==windowsthread) {
        NextIDT=WindowsIDT;
        } ifdef DEBUG

// Make sure that the ISR bit for our interrupt is NOT set at this point.
// It should be clear. Trap if set and force clear.

if (ReadAPIC(0x100+(ApicTimerVector/32)*0x10)&(1<<(ApicTimerVector%32))) {

Trap();

// The only way to clear this is to EOI the APIC. If our EOI does
        // not clear it then we are screwed.

WriteAPIC(APICEOI, 0);

} endif
```

```
ifdef MASKABLEINTERRUPT

// WARNING WARNING if you move this up to the beggining of the routine,
// do NOT forget to change lastthread to currentthread!!!!!!

if (lastthread!=windowsthread) {

// EOI the APIC for the maskable rt thread interrupt.

if (ReadAPIC(0x100+(RTMASKABLEIDTINDEX/32)*0x10)&(1<<(RTMASKABLEIDTINDEX%32))) {

WriteAPIC(APICEOI, 0);

}
else {

//      Trap();  May not happen if we RtYield!!!!

}

}

// Make sure it is now clear.

if (ReadAPIC(0x100+(RTMASKABLEIDTINDEX/32)*0x10)&(1<<(RTMASKABLEIDTINDEX%32))) {

Trap();

WriteAPIC(APICEOI, 0);

}
endif

// In debug code, make sure ALL TMR bits are clear. Trap if not.
#ifdef DEBUG
{
LONG tmr;

for (tmr=0x180;tmr<0x200;tmr+=0x10) {
        if (ReadAPIC(tmr)) {
                Trap();
                }
        }
}
endif // In debug code, make sure ALL ISR bits are clear. Trap if not.
ifdef DEBUG
```

```
{
LONG isr;

for (isr=0x100;isr<0x180;isr+=0x10) {
        if (ReadAPIC(isr)) {
                Trap();
                }
        }
}
endif if 0

// In debug code, make sure ALL IRR bits except ours are clear.  Trap if not.

#ifdef DEBUG
{
LONG irr;

for (irr=0x200;irr<0x280;irr+=0x10) {
        if (ReadAPIC(irr)) {
                Trap();
                }
        }
}
endif endif

// TODO: In debug code make sure all of our interrupts are still properly hooked.

if (lastthread->state==EXIT) {
        // Remove the previous thread from the list of threads to run as
        // it has exited.
        // Make sure we never exit from the Windows thread.
        if (lastthread==windowsthread) {
                Trap();
                lastthread->state=RUN; // put Windows thread back in RUN state
                }
        else {
                // If we get here, then the lastthread has exited and is NOT the
                // windows thread.  So remove it from the list of running realtime
                // threads.
                RemoveRtThread(lastthread);

// Now atomically add it to the list of dead realtime threads - so its resources
                // will be released the next time RtCreateThread or RtDestroyThread are
                // called.

lastthread->next=RtDeadThreads;
```

```
        while (RtpCompareExchange(&(ULONG)RtDeadThreads, (ULONG)lastthread,
(ULONG)lastthread->next)!=(ULONG)lastthread) {
                        // If we get here, then the compare exchange failed because either another
                        // thread was added to the list since we read RtDeadThreads,
                        // or another Windows thread cleaned up the dead thread list and
                        // RtDeadThreads is now null when it wasn't before.
                        // Retry adding our thread to the list.
                        lastthread->next=RtDeadThreads;
                        }

// Mask the realtime scheduler interrupt if there is only the windows thread.

if (RtThreadCount<=1) {
                        // Mask the local apic timer interrupt.
                        *ApicTimerInterrupt=ApicTimerVector|MASKED|PERIODIC;
                        // Mask the performance counter interrupt.
                        DisablePerformanceCounterInterrupt();
                        }

}

}

// Make sure if there are any realtime threads that the local timer interrupt
// is enabled.

if (RtThreadCount>1) {

/*
ifdef DEBUG if (*ApicTimerInterrupt!=(ApicTimerVector|UNMASKED|PERIODIC)) {
                Trap();
                } endif
*/

// Unmask the local apic timer interrupt.
        *ApicTimerInterrupt=(ApicTimerVector|UNMASKED|PERIODIC);
        } if (currentthread==windowsthread) {

// Mask the performance counter interrupt.

DisablePerformanceCounterInterrupt();

#ifdef CATCH_INTERRUPTS_DISABLED_TOO_LONG
    *ApicPerfInterrupt=ApicPerfVector|UNMASKED;
    EnablePerfCounters=StopCounter;
```

```
#else
        EnablePerfCounters=0;
endif ifdef MASKABLEINTERRUPT

// Reset the performance counters. Perfomance HIT.
        // We should NOT need to do this.
        SetTimeLimit( 0, 0);

// Unmask the normal interrupts at the local apic.
        *ApicIntrInterrupt=EXTINT|UNMASKED;

if (InjectWindowsInterrupt) {
                HandleWindowsInterrupt.offset=InjectWindowsInterrupt;
                InjectWindowsInterrupt=0;
                InjectedInterruptCount++;
        }

// Enable the interrupt that will get us out of windows.
        // Leave the maskable performance counter interrupt masked.

// That is critical since otherwise we get invalid dyna-link
        // blue screens.

WriteAPIC(APICTPR, 0x30);

#endif

} else {

LONG timelimit;

#ifdef MASKABLEINTERRUPT
        // Mask normal interrupts at the local apic.
        // We do this instead of running with interrupts disabled.
        // On 9x where the IO apic is not used this will work the same
        // as disabling interrupts - except that now we can make the
        // syncronization that depends on PUSHFD/CLI/STI/POPFD work properly.

// I can fix ntkern so it will be NMI safe, but this is the
        // easiest and safest way to get the current functions safe
        // it also gets us any windows functions that ntkern calls
        // that depend on PUSHFD/CLI/STI/POPFD syncronization.

*ApicIntrInterrupt=EXTINT|MASKED;

// Eat APIC timer interrupts that fire during realtime threads.
        // The only way that should happen is if someone in windows
        // masked interrupts enough to hold off the APIC timer interrupt
        // so much that the next one fired while we were still running
```

// our realtime threads.

*ApicTimerInterrupt=ApicTimerVector|MASKED|PERIODIC;

// Enable all of the local apic interrupts. Including the
// performance counter interrupt.
// Leave the maskable performance counter interrupt masked.

WriteAPIC(APICTPR, 0);

endif

// Setup the performance counters for the next interrupt.

timelimit=(LONG)(RtCpuCyclesPerUsec*1000*currentthread->Statistics->Duration/currentthread->Statistics->Period);
    if (timelimit<MINIMUMCYCLECOUNT) {
        // In this case, we run instructions instead of cycles so that we
        // can guarantee that the thread runs at least a little each slice.
        timelimit=10;
        EnablePerfCounters=StartInstructionCounter;
        }
    else {
        EnablePerfCounters=StartCycleCounter;
        }

SetTimeLimit(timelimit, 0);

// Unmask the performance counter interrupt.

PerformanceInterruptState&=~(MASKPERF0INT);
    *ApicPerfInterrupt=ApicPerfVector|UNMASKED;

}

// Load irql for thread we are entering.
*pCurrentIrql=(KIRQL)currentthread->irql;

LoadThreadStatePointer();

RestoreSegmentState();

RestoreRegisterState();

RestoreThreadStack();

RestoreOriginalDS();

LoadCR0(NextCR0);

RestoreEAX();

LoadIDT(NextIDT);

// Fix up ds so we can access the memory we need to.
// We need a valid ds so we can save the IDT and so that we can
// check our reenter count.

```
__asm{
        push ds
        mov ds, cs:RealTimeDS
        }
```

SaveIDT(DebugIDT);

```
__asm {
        dec SwitchRtThreadReenterCount
        pop ds
        jz leaveclean
        int 3
leaveclean:
        }
``` ifdef MASKABLEINTERRUPT

// If we are returning to windows and we allowed interrupts when we
// left windows, and we raised irql, then we need to lower irql
// here. That will cause all of the pending dpcs to get processed.

// We are NOT guaranteed to have a flat stack, so we MUST get our
// own FLAT DS before we try to touch our variables.

```
__asm {
        push ds
        push ecx
        mov ds, cs:RealTimeDS
        mov ecx, currentthread
        cmp ecx, windowsthread
        jnz irqllowered
        cmp EnabledInterrupts, 1
        jl irqllowered
        jz checkirql // If we get here, then EnabledInterrupts is greater than 1. That
        // should NEVER be the case. We need to crash and burn in that case.
        int 3 checkirql:
        int 3
        dec EnabledInterrupts
```

```
        mov ecx, pCurrentIrql
        movzx ecx, byte ptr[ecx]
        cmp ecx, OriginalIrql
        je irqllowered
        ja lowerirql // We only get here, if the OriginalIrql is greater than the CurrentIrql.
        // That will only happen if we screwed up.
        int 3 lowerirql:

mov ecx, OriginalIrql
        pushad
        call WrapKfLowerIrql
        popad irqllowered:
        // Restore registers.
        pop ecx
        pop ds
        }
```

// Here we inject any interrupts required into windows. This code
// should almost NEVER get run.

```
__asm {
        // Save space on stack for far return.
        sub esp,8
        // Get a DS we can access our data with.
        push ds
        mov ds, cs:RealTimeDS
        // Check if we need to inject an interrupt into windows.
        test HandleWindowsInterrupt.offset,0xffffffff
        jz skipit
        // Set up the stack with the appropriate address.
        push eax
        xor eax,eax
        mov ax, HandleWindowsInterrupt.selector
        mov dword ptr[esp+12], eax
        mov eax, HandleWindowsInterrupt.offset
        mov dword ptr[esp+8], eax
        pop eax
        // Clean up DS and jump to handler.
        pop ds
        retf
skipit:
        // Restore DS and cleanup stack.
        pop ds
        add esp,8
        }
```

```
#endif

TurnOnPerformanceCounters();

Return();

}
```

<div align="center">Source code for "rtinfo.h"</div>

```
// Here are the valid thread states.

enum {
        RUN,
        YIELD,
        BLOCKEDONSPINLOCK,
        SPINNINGONSPINLOCK,
        YIELDAFTERSPINLOCKRELEASE,
        EXIT,
        DEAD
        };

typedef struct {
  ULONG *pRtCs;
  volatile CHAR **pBase;
  volatile ULONG **pThread;
  BOOL (**pFunction1)(WORD State, ULONG Data, BOOL (*DoTransfer)(PVOID), PVOID Context);
  VOID (**pFunction2)(VOID (*Operation)(PVOID), PVOID Context);
        } NtRtData, *pNtRtData;

typedef struct {
  ULONG *pRtCs;
  volatile CHAR **pBase;
  VOID (**pFunction)(VOID (*Operation)(PVOID), PVOID Context);
        } VmmRtData, *pVmmRtData;

typedef struct {
  VOID (**pFunction)(VOID);
        } VpdRtData, *pVpdRtData;
```

Source code for "rt.h."

```c
// rt.h

// Copyright Microsoft Corporation 1999

// Author: Joseph Ballantyne

// This is the public include file for real-time executive clients.

#ifdef __cplusplus
extern "C" {
endif define CPUCYCLES           0x10000
define INSTRUCTIONS 0x20000 define USESFLOAT           0x00001
define USESMMX             0x00002 define THISPERIOD 0
define THISTIMESLICE 1 define WEEK 604800000000000000I64
define DAY  86400000000000000I64
#define HOUR 3600000000000000I64
#define MIN  60000000000000I64
#define SEC  1000000000000I64
#define MSEC 1000000000I64
#define USEC 1000000I64
#define NSEC 1000I64
define PSEC 1I64 define X86 1
define INTEL 1
define AMD 2 typedef struct {
        ULONG CpuManufacturer;     // Manufacturer ID, Intel==1, AMD==2
        ULONG CpuArchitecture;// Architecture of CPU, currently always X86==1
        ULONG CpuFamily;           // CPU Family as reported by cpuid instruction. 0x0-0xf
        ULONG CpuModel;                    // CPU Model as reported by cpuid instruction. 0x0-0xf
        ULONG CpuStepping;         // CPU Stepping as reported by cpuid instruction. 0x0-0xf
        ULONGLONG CpuFeatures;     // CPU features as reported by cpuid instruction.
```

```
        ULONGLONG CpuExtendedFeatures;        // AMD extended features. (Not implemented.) Always
0.
        ULONGLONG ProcessorID[2];              // Processor Unique ID. If enabled. (Not implemented.)
        ULONG CpuCyclesPerMsec;                      // Number of cpu cycles per MSEC.
        ULONG SystemBusCyclesPerMsec;          // Number of system bus cycles per MSEC.
} SystemInfo;
```

// The following real-time thread statistics are updated just before control is
// passed by the real-time executive to the real-time thread. Everytime a real-time
// thread is being switched in, these statistics are updated before control is transfered.
// This means the statistics will change over time, but not while a real-time
// thread is running between thread switches.

pragma pack(push,2)

```
typedef struct threadstats {
        ULONGLONG Period;                      // Period as passed to RtCreateThread or latest RtAdjustCpuLoad
call.
        ULONGLONG Duration;                    // Duration from RtCreateThread or latest RtAdjustCpuLoad call.
        ULONG Flags;                           // Flags from RtCreateThread or latest RtAdjustCpuLoad call.
        ULONG StackSize;                       // StackSize from RtCreateThread call.
        ULONGLONG PeriodIndex;                                 // Number of periods since start
of thread.
        ULONGLONG TimesliceIndex;                              // Number of times thread has been
switched to.
        ULONGLONG TimesliceIndexThisPeriod;    // Number of times thread switch to this period.
        ULONGLONG ThisPeriodStartTime;         // Starting time for current period.
        ULONGLONG ThisTimesliceStartTime;      // Starting time for current timeslice.
        ULONGLONG DurationRunThisPeriod;       // Total time run so far this period.
        ULONGLONG DurationRunLastPeriod;       // Total time run in the last period.
} ThreadStats;
``` pragma pack(pop)

typedef VOID (*RTTHREADPROC)(PVOID Context, ThreadStats *Statistics);

```
NTSTATUS RtVersion(
        OUT PULONG Version
        );
```

// RtVersion will return the version number of the currently running
// real-time executive.

// If the real-time executive is running, this function returns
// STATUS_SUCCESS. If for some reason the real-time executive
// cannot run on the current machine then STATUS_NOT_SUPPORTED
// is returned.

// Currently the real-time executive will only run on PII class or newer
// machines.

// If the pointer to the version number is non NULL, then the
// version information for the currently loaded real-time executive
// is returned. The version information will be returned regardless
// of the NTSTATUS code returned by the function.

// The version number returned is in the format xx.xx.xx.xx where each
// xx is 1 byte of the ULONG and the ordering left to right is high
// order byte -> low order byte. ie: 0x01020304 is version 1.2.3.4

// It IS acceptable to pass in a NULL version pointer. In that case
// no version information is returned.

// If this function is called from a real time thread, then the version
// pointer MUST either be NULL, or it MUST point to a local variable on
// that real time thread's stack. Otherwise this function will return
// STATUS_INVALID_PARAMETER.

// If this function is called from Windows, then the pointer must be
// valid for writing. Otherwise it will return STATUS_INVALID_PARAMETER.

// This function may be called from any thread. Windows or real-time.

BOOL RtThread(VOID);

// RtThread returns TRUE if called from within a real-time thread. Otherwise
// it returns FALSE.

NTSTATUS RtSystemInfo(
    ULONG Processor,
    SystemInfo *pSystemInfo
    );

// RtSystemInfo copies the pertinant processor and system information into the memory
// pointed to by pSystemInfo. If pSystemInfo is null or invalid, then RtSystemInfo
// returns STATUS_INVALID_PARAMETER_2. Otherwise RtSystemInfo will return STATUS_SUCCESS.

// For uniprocessor systems, the Processor number should be zero. For N processor
// systems, the processor numbers range from 0 to N-1. An invalid processor number
// will cause a STATUS_INVALID_PARAMETER_1 to be returned.

NTSTATUS RtCreateThread(
    ULONGLONG Period,
    ULONGLONG Duration,
    ULONG Flags,

```
    ULONG StackSize,
    RTTHREADPROC RtThread,
    IN PVOID pRtThreadContext,
    OUT PHANDLE pRtThreadHandle
    );
```

// RtCreateThread is used to create a real-time thread.

// Period is the used to determine the frequency at which the real-time thread must be
// run. The current minimum period that can be specified is 1ms.

// Duration is the amount of time within the period that the real-time thread will
// need to run. Percentage CPU load can be calculated as 100*(Duration/Period) as long
// as Duration and Period are both specified in units of time.

// Flags
// This parameter is used to indicate specific requirements of the real-time thread
// being created. Currently supported values for Flags are USESFLOAT and USESMMX.
// A real-time thread that can use floating point instructions must specify the
// USESFLOAT flag. A real-time thread that can use MMX instructions must specify the
// USESMMX flag.

// StackSize is the size of the stack required by the real-time thread in 4k blocks.
// Currently StackSize must be between 1 and 8 inclusive. RtCreateThread will fail
// with STATUS_UNSUCCESSFUL for any other values of StackSize.

// pRtThreadContext is a pointer to the context that should be passed to the thread.
// It may be NULL. It is passed to the real-time thread as the Context parameter.

// pRtThreadHandle is a pointer to an RtThreadHandle that can be output from
// RtCreateThread. pRtThreadHandle can be NULL, in which case no RtThreadHandle is
// returned. Storage for the HANDLE RtThreadHandle must be allocated by the code
// that calls RtCreateThread.

// RtCreateThread may only be called from within a standard windows thread. It MUST NOT
// be called from within a real-time thread.

```
NTSTATUS RtDestroyThread(
    HANDLE RtThreadHandle
    );
```

// RtDestroyThread removes the real-time thread identified by RtThreadHandle from the
// list of running real-time threads, and releases all resources that were allocated when
// the thread was created. RtThreadHandle must be a handle returned from RtCreateThread.

// RtDestroyThread may only be called from within a standard windows thread. It MUST NOT
// be called from within a real-time thread.

```
NTSTATUS RtAdjustCpuLoad(
```

```
        ULONGLONG Period,
        ULONGLONG Duration,
        ULONG Flags
        );
```

// This function allows a real-time thread to adjust the amount of CPU that is allocated
// to it. The Flags parameter must currently match that passed in at thread creation
// time, however, the Period and Duration may be different from the Period and Duration
// passed at thread create time. If there is sufficient CPU to meet the new request,
// the function will return STATUS_SUCCESS and the Period and Duration in the thread's
// statistics will be updated to match the values passed in to this function. If
// there is not enough CPU available to meet the request, this function will leave
// the Period and Duration recorded in Statistics unchanged and will return
// STATUS_INSUFFICIENT_RESOURCES.

// This function MUST be called from within a real-time thread. A real-time thread can
// only change its OWN allocation. It cannot change the allocation of any other
// real-time thread.

```
VOID RtYield(
        ULONGLONG Mark,
        ULONGLONG Delta
        );
```

// RtYield will yield execution to other real-time threads in the system.

// It should be called whenever a real-time thread does not require further CPU resources.

// Parameters:
// Mark
//              This is the reference time which will be subtracted from the current
//              real-time executive scheduler time. Note that this time is ALWAYS
//              considered by the scheduler to be in the past. Do NOT pass a time
//              which occurs in the future to this parameter.
//      Delta
//              This is the time that will be compared to the difference between the current
//              scheduler time and the mark. The thread will yield execution until
//              the difference between the current scheduler time and the mark is greater
//              than delta.

//              After a thread has called RtYield it will only be run when the following
//              code evaluates TRUE. ( (RtTime() - Mark) >= Delta ) Until that occurs
//              the thread will NOT run. Unless it is holding a spinlock required by
//              some other real-time thread - in which case it will run until it releases
//              the spinlock at which point it will again yield.

```
BOOL RtCompareExchange(
        ULONG *result,
        ULONG *destination,
```

```
    ULONG source,
    ULONG value
    );
```

// RtCompareExchange wraps a locked compare exchange instruction. It is multiprocessor
// and real-time safe. It allows atomic exchange operations to be performed within a
// real-time thread.

// In a single atomic operation, RtCompareExchange compares value with *destination.
// If value==*destination, then it sets the zero flag and loads *destination with source.
// Otherwise it clears the zero flag and loads a register with *destination. All of
// this is done in a single locked instruction - and so is both multiprocessor and
// real-time safe. If the zero flag is set, then *result is loaded with source and
// the function returns TRUE. If the zero flag is clear, then *result is loaded with
// the register that was loaded with *destination and the function returns FALSE.

// The following standard WDM functions are also safe to call from within a real time
// thread: KeAcquireSpinLock and KeReleaseSpinLock.

// They have been modified to support real-time threads in the following ways:

// KeAcquireSpinLock

// KeAcquireSpinLock will now always attempt to take the spinlock regardless of whether it
// is running on a multiproc or uniproc machine. If the spinlock is already acquired,
// then KeAcquireSpinLock will spin in a loop that calls RtYield(THISTIMESLICE) until
// the spinlock is released.

// It will then claim the spinlock. This means that real-time threads that attempt to
// acquire a held spinlock will BLOCK until the spinlock is free. If you don't HAVE to use
// spinlocks in your real-time threads, DON'T.

// Note that other real-time threads will continue to run as scheduled, but the thread
// waiting for the spinlock will continue yielding all its timeslices until the spinlock
// is released.

// If KeAcquireSpinLock is called from a real-time thread, then it will NOT attempt to
// change any irql levels. This is important, since the current Windows IRQL level may
// be at higher than DISPATCH_LEVEL when this function is called. Furthermore, the OldIrql
// returned by this function when it is called from a real-time thread is always 0xff -
// which is an INVALID irql level.

// If you call KeAcquireSpinLock from a real-time thread you MUST call KeReleaseSpinLock
// for that spinlock from a real-time thread.

// Evenutally, KeAcquireSpinLock will be modified to do an RtDirectedYield to the real-time
// thread that is holding the spinlock.

// KeAcquireSpinLock may be called from within any thread. Real-time or windows.

// KeReleaseSpinLock

// KeReleaseSpinLock now always attempts to release a held spinlock regardless of whether
// it is running on a multiproc or uniproc machine.

// If KeReleaseSpinLock is called from a real-time thread, then it will NOT change any irql
// levels. It will also validate that it has been called with a new irql level of 0xff
// as would have been returned by the KeAcquireSpinLock call in the real-time thread to
// acquire the spinlock.

// At some point KeReleaseSpinLock may do an RtDirectedYield back to the real-time thread
// that yielded when it attempted to acquire the spinlock.

// KeReleaseSpinLock may be called from within any thread. Real-time or windows.

```
#ifdef __cplusplus
}
endif
```

I claim:

1. For a CPU running a non-real-time operating system, a method of scheduling CPU resources comprising:
   a. defining a time slot for which a first real-time thread will be guaranteed said CPU resources for at least a first portion of said time slot;
   b. treating the non-real-time operating system as a second real-time thread;
   c. allocating, to the second real-time thread, a second portion of the time slot during which the second real-time thread will be guaranteed said CPU resources;
   d. executing the first real-time thread during said first portion of the time slot;
   e. executing the second real-time thread during said second portion of the time slot;
   f. allocating, to one or more other real-time threads, respective one or more other portions of said time slot for which said one or more other real-time threads are guaranteed said CPU resources; and
   g. executing said one or more other real-time threads for their said respective one or more other portions of said time slot, wherein the time slot is defined by an APIC, which issues an interrupt, a performance counter issues a performance-counter interrupt in order to switch allocation of said CPU resources between said real-time threads, and the performance-counter interrupt is non-maskable.

2. The method of claim 1, further including the step of executing the second real-time thread during an unallocated portion of the time slot, whenever at least one portion of the time slot is not allocated.

3. The method of claim 2, wherein all unallocated portions of said time slot are used by said second real-time thread.

4. The method of claim 3, further comprising the step of:
   said first real-time thread yielding a portion of said first portion of said time slot to said second real-time thread.

5. The method of claim 1, further comprising the step of dynamically determining a duration of said first portion of said time slot based on historical use of resources by said first real-time thread.

6. The method of claim 1, further comprising the step of synchronizing a plurality of said real-time threads using one or more spinlocks.

7. The method of claim 1, further comprising the step of allowing at least one of said real-time threads to request a portion of said time slot for which said at least one of said real-time threads will be guaranteed said CPU resources.

8. A method of scheduling CPU resources comprising:
   a. defining a repeating time slot for which said CPU resources are allocated;
   b. assigning a first portion of said time slot to a first real time thread corresponding to a non-real time operating system, thereby guaranteeing a minimum percentage of said CPU resources to said operating system;
   c. assigning a second portion of said time slot to a second real time thread;
   d. executing said real time threads during their assigned portions of said time slot; and
   e. reassigning a remaining portion of said second portion to said first real time thread when said second real time thread concludes, wherein the time slot is defined by an APIC, which issues an interrupt, and wherein the APIC interrupt is non-maskable.

9. The method of claim 8, further including the step of executing the first real-time thread during an unallocated portion of the time slot, whenever at least one portion of the time slot is not allocated.

10. The method of claim 9, wherein all unallocated portions of said time slot are used by said first real-time thread.

11. The method of claim 10, further comprising the step of:
    said second real-time thread yielding a portion of said second portion of said time slot to said first real-time thread.

12. The method of claim 8, further comprising the step of dynamically determining a duration of said second portion of said time slot based on historical use of resources by said second real-time thread.

13. The method of claim 8, further comprising the step of synchronizing a plurality of said real-time threads using one or more spinlocks.

14. The method of claim 8, further comprising the step of allowing at least one of said real-time threads to request a portion of said time slot for which said at least one of said real-time threads will be guaranteed said CPU resources.

15. A method of scheduling CPU resources comprising:
    a. defining a repeating time slot for which said CPU resources are allocated;
    b. assigning a first portion of said time slot to a first real time thread corresponding to a non-real time operating system, thereby guaranteeing a minimum percentage of said CPU resources to said operating system;
    c. assigning a second portion of said time slot to a second real time thread;
    d. executing said real time threads during their assigned portions of said time slot; and
    e. reassigning a remaining portion of said second portion to said first real time thread when said second real time thread concludes, wherein a performance counter issues a performance-counter interrupt in order to switch allocation of said CPU resources between said real-time threads, and wherein the performance-counter interrupt is non-maskable.

16. The method of claim 15, further including the step of executing the first real-time thread during an unallocated portion of the time slot, whenever at least one portion of the time slot is not allocated.

17. The method of claim 16, wherein all unallocated portions of said time slot are used by said first real-time thread.

18. The method of claim 17, further comprising the step of:
    said second real-time thread yielding a portion of said second portion of said time slot to said first real-time thread.

19. The method of claim 15, further comprising the step of dynamically determining a duration of said second portion of said time slot based on historical use of resources by said second real-time thread.

20. The method of claim 15, further comprising the step of synchronizing a plurality of said real-time threads using one or more spinlocks.

* * * * *

UNITED STATES PATENT AND TRADEMARK OFFICE
CERTIFICATE OF CORRECTION

PATENT NO. : 6,957,432 B2  
APPLICATION NO. : 09/961649  
DATED : October 18, 2005  
INVENTOR(S) : Joseph Ballantyne Page 1 of 1

It is certified that error appears in the above-identified patent and that said Letters Patent is hereby corrected as shown below:

On the title page, in "Primary Examiner", in column 2, line 1, delete "Majid Bananhhah" and insert -- Majid Banankhah --, therefor.

In column 2, line 1, delete "rung" and insert -- running --, therefor.

In column 5, line 66, delete "64MMX" and insert -- 64GB MMX --, therefor.

In column 7, line 58, delete "Window®" and insert -- Windows® --, therefor.

In column 41, line 6, delete "thead" and insert -- thread --, therefor.

Signed and Sealed this

Third Day of November, 2009

David J. Kappos  
*Director of the United States Patent and Trademark Office*